United States Patent

Sugaya

[11] Patent Number: 5,812,710
[45] Date of Patent: Sep. 22, 1998

[54] APPARATUS AND METHOD FOR OPTICAL EQUALIZATION AND AMPLIFICATION

[75] Inventor: Yasushi Sugaya, Kawasaki, Japan

[73] Assignee: Fujitsu Limited, Kawasaki, Japan

[21] Appl. No.: 771,756

[22] Filed: Dec. 20, 1996

[30] Foreign Application Priority Data

Feb. 7, 1996 [JP] Japan ................................ 8-021337

[51] Int. Cl.⁶ .................................................... G02B 6/28
[52] U.S. Cl. ........................ 385/27; 359/127; 359/337; 359/341; 385/24
[58] Field of Search ................................. 385/15, 24, 27, 385/31, 39; 359/124, 127–131, 154, 161, 173, 174, 179, 333, 337–339, 341, 349

[56] References Cited

U.S. PATENT DOCUMENTS

| 5,050,949 | 9/1991 | DiGiovanni et al. | 359/341 |
| 5,225,922 | 7/1993 | Chraplyvy et al. | 359/124 |
| 5,392,154 | 2/1995 | Chang et al. | 359/341 |
| 5,541,766 | 7/1996 | Mizrahi et al. | 359/337 |
| 5,600,481 | 2/1997 | Nakabayashi | 359/341 |
| 5,636,054 | 6/1997 | Artigaud et al. | 359/341 |

FOREIGN PATENT DOCUMENTS

| 0 467 396 A2 | 1/1992 | European Pat. Off. . |
| 0 543 314 A2 | 5/1993 | European Pat. Off. . |
| 0 543 570 A2 | 5/1993 | European Pat. Off. . |
| 0 652 613 A2 | 5/1995 | European Pat. Off. . |
| 0 734 129 A2 | 9/1996 | European Pat. Off. . |
| 5-110511 | 4/1993 | Japan . |
| 5-136512 | 6/1993 | Japan . |
| 7-202306 | 8/1995 | Japan . |

Primary Examiner—John D. Lee
Attorney, Agent, or Firm—Staas & Halsey

[57] ABSTRACT

A variable optical attenuator is provided at an input terminal of a rare-earth doped optical fiber. The variable optical attenuator attenuates a multiwavelength light under the control of an AGBC circuit. The rare-earth doped optical fiber, which is excited by an excitation light generated by a light source, amplifies the multiwavelength light output from the variable optical attenuator. An ALC circuit controls the light source in such a way that an average optical level of the multiwavelength light output from the rare-earth doped optical fiber is kept constant. The wavelength division multiplexing coupler selects two optical signals having different wavelengths from the multiwavelength light amplified by the rare-earth doped optical fiber. The AGBC circuit controls the attenuation of the variable optical attenuator in such a way that the above described two optical signal levels match each other.

27 Claims, 33 Drawing Sheets

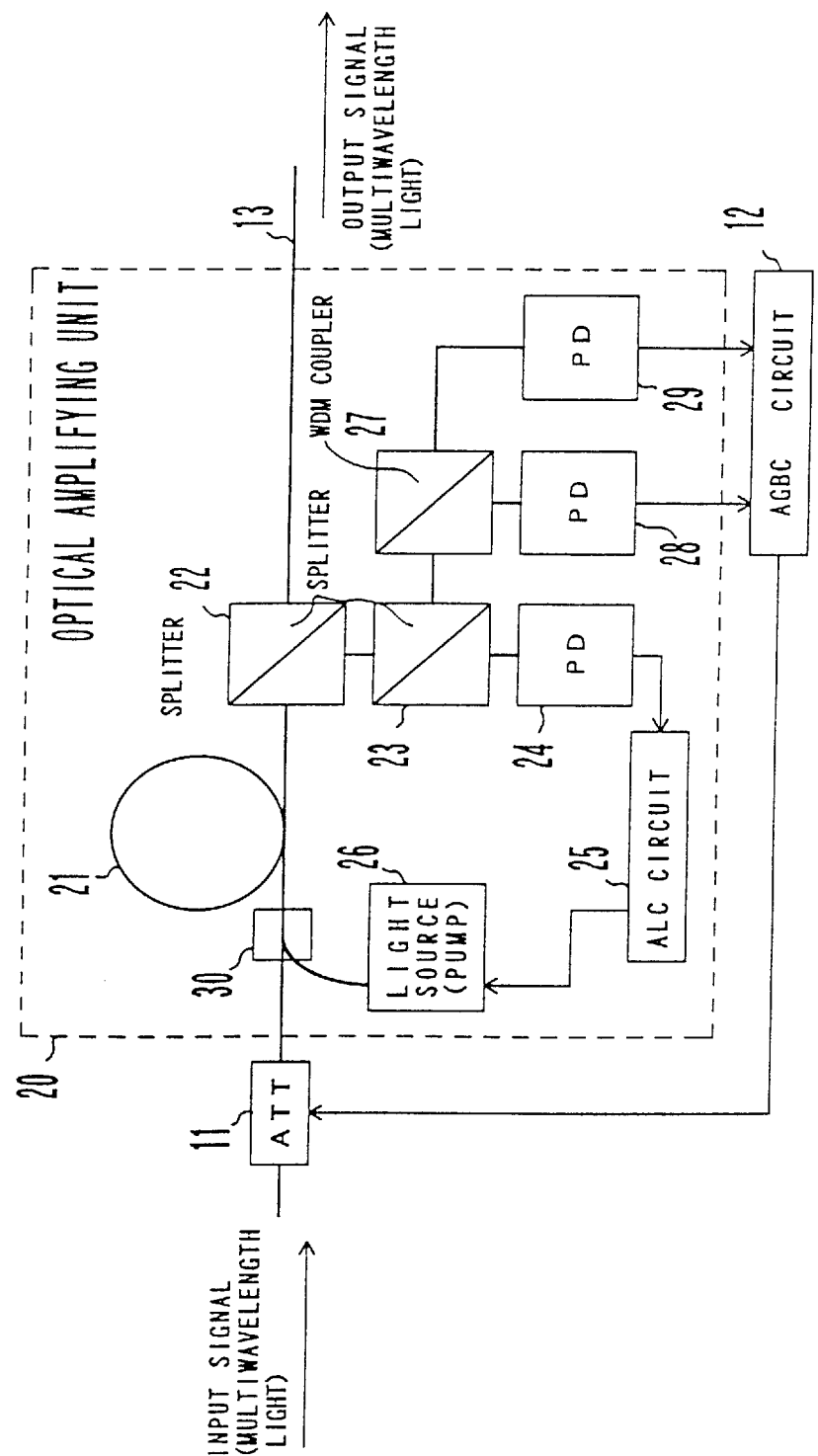
F I G. 5

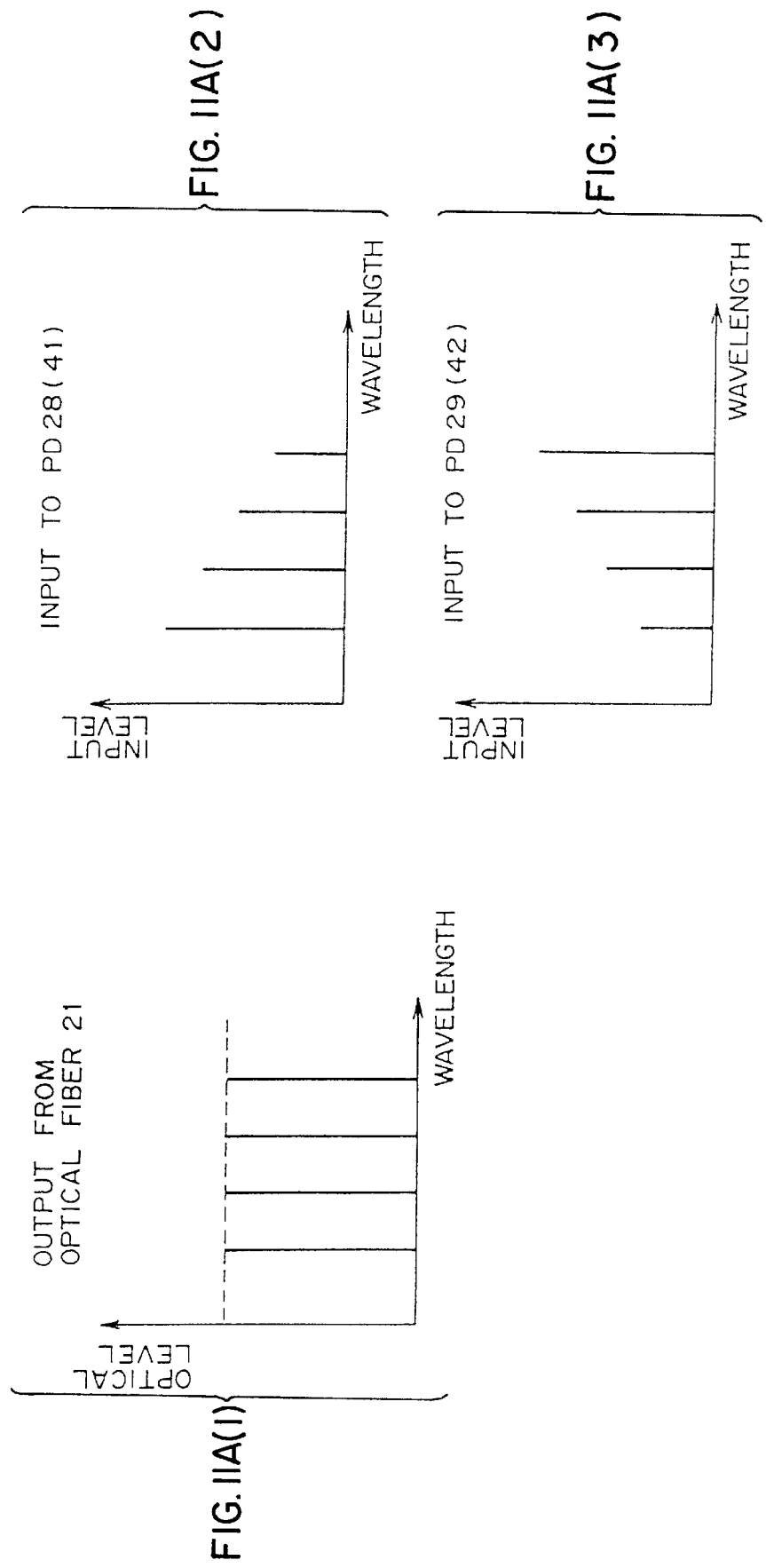

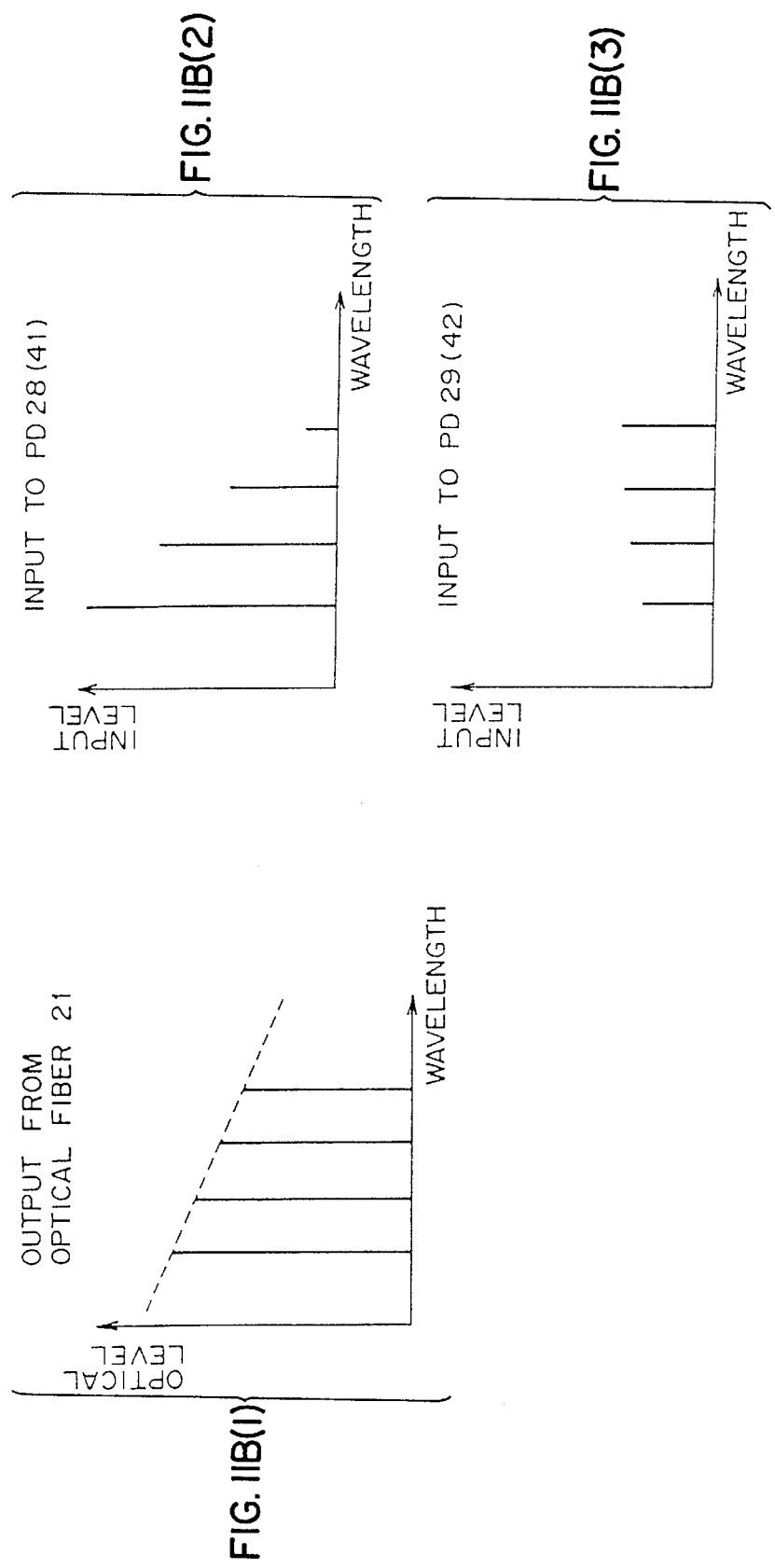

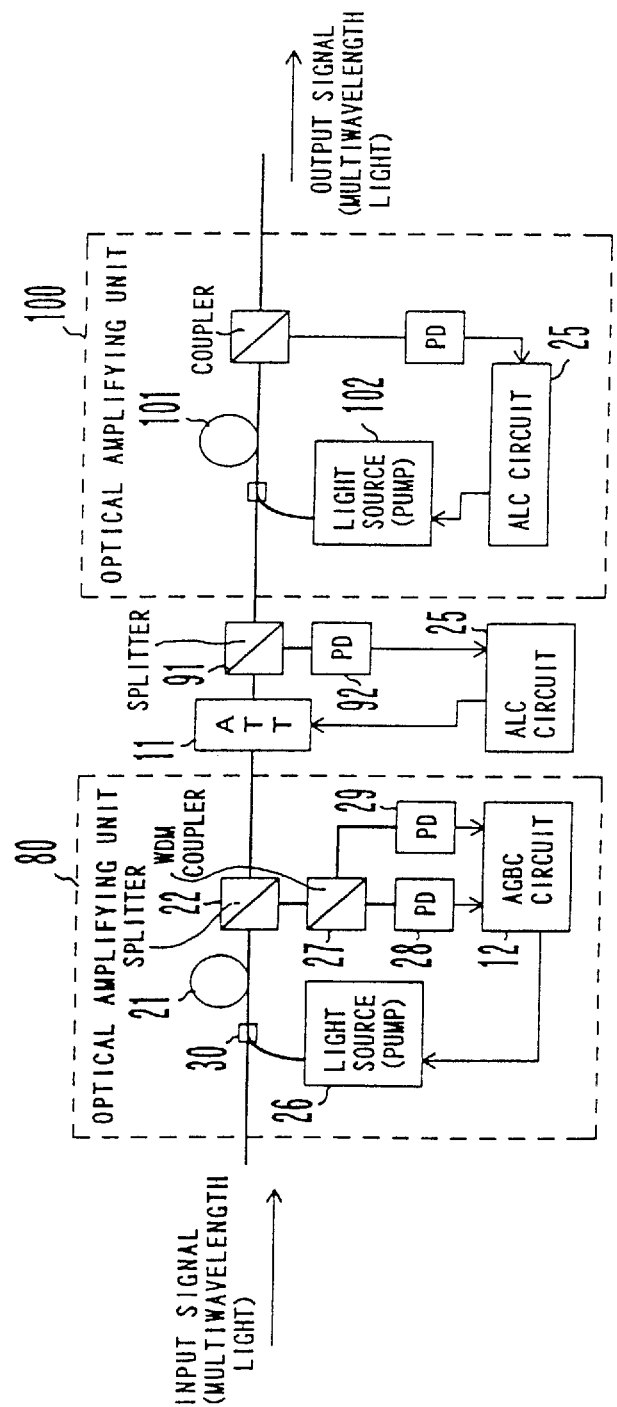
F I G. 1 9

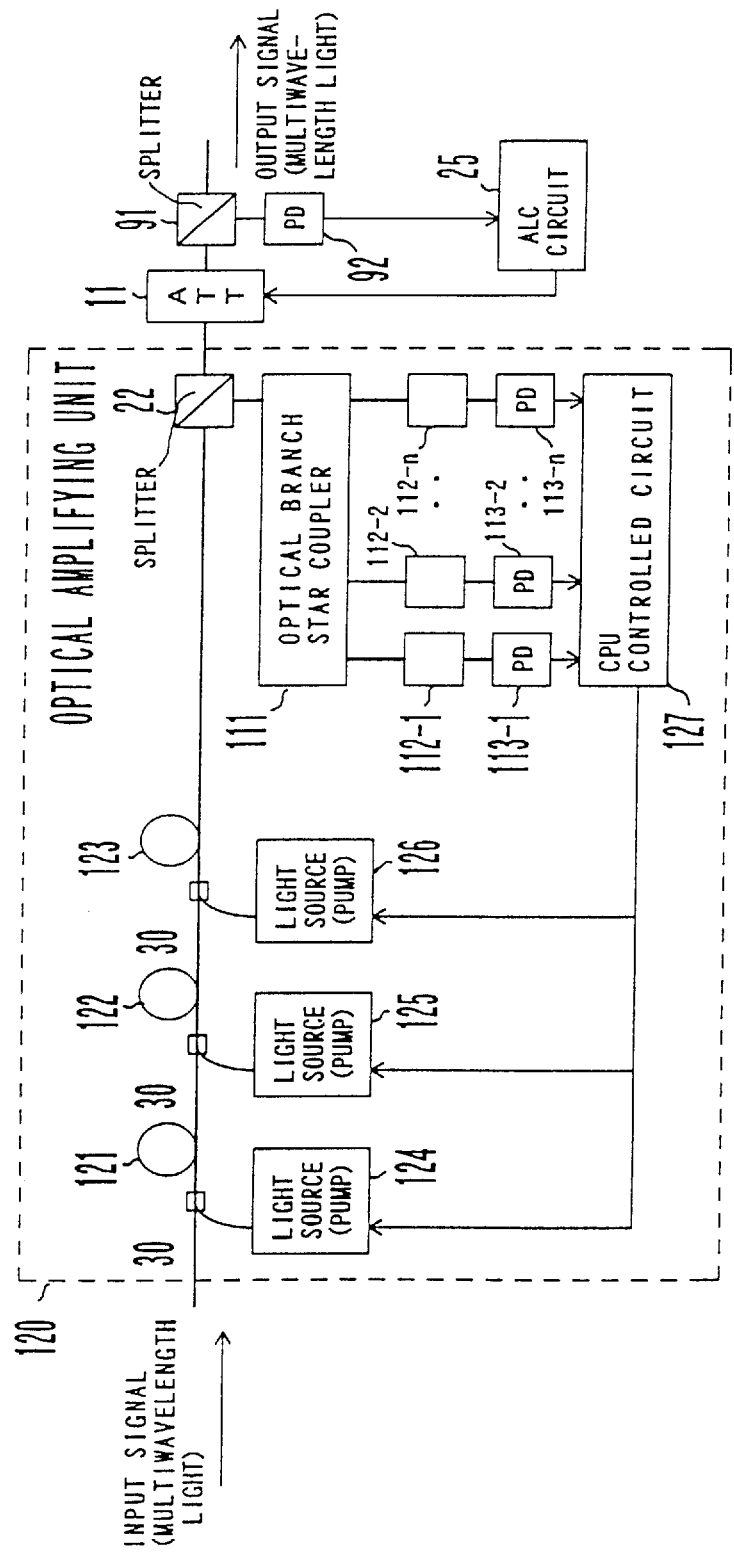
F I G. 23

| Ps / Pmin | LIGHT SOURCE 124 | Pt / Pmin | LIGHT SOURCE 125 | Pmax / Pmin | LIGHT SOURCE 126 |
|---|---|---|---|---|---|
| ⋮ | ⋮ | ⋮ | ⋮ | ⋮ | ⋮ |

FIG. 26

APPARATUS AND METHOD FOR OPTICAL EQUALIZATION AND AMPLIFICATION

BACKGROUND OF THE INVENTION

1. Field of the Invention

The present invention relates to an optical amplifier, and more specifically to an optical equalizing amplifier for use in a wavelength division multiplexing transmission.

2. Description of the Related Art

With the increasing amount of information transmitted through a network, there have been various technologies studied and developed to provide an efficient high-speed and large-capacity network.

The wavelength division multiplexing transmission relates to a technology for providing a large-capacity network. The wavelength division multiplexing transmission is a system of multiplexing an optical signal having a plurality of different wavelengths in a single optical transmission line, and information can be transmitted for each wavelength.

FIG. 1 shows the relationship between a wavelength and an optical level in the wavelength division multiplexing transmission. FIG. 1 shows an example of transmitting a signal using four different wavelengths in the band of 1.55 $\mu$m. The signals having these four wavelengths are multiplexed and transmitted through a single optical fiber. The channel along which a signal is transmitted is assigned to each wavelength. That is, in the example shown in FIG. 1, the wavelength division multiplexed optical signal is transmitted along four channels (ch 1 through ch 4).

On the other hand, more and more information is being transmitted internationally. For example, the amount of information transmitted between continents is increasing. In such long-distance transmissions, especially an optical cable is used to transmit a large volume of information. However, when a signal is transmitted via an optical fiber, the signal is attenuated as the transmission distance becomes longer. Therefore, in a long-distance optical transmission, nodes having light amplifiers are provided at predetermined intervals, and a signal is regenerated in each node and transmitted to the next node.

Various embodiments have been developed as light amplifiers for amplifying an optical signal. An optical fiber amplifier is one of them. Especially, in the band of 1.55 $\mu$m, a rare-earth doped optical fiber amplifier to which a rare-earth substance such as erbium is applied is widely used. The rare-earth doped optical fiber amplifier sets a rare-earth substance, etc. in an excited state using an excitation light input separately from an optical signal, and amplifies the optical signal through an excitation energy.

When a multiwavelength light including a wavelength division multiplexed optical signal is amplified using an optical fiber amplifier, input optical signals, each transmitted on different wavelength, are normally collectively amplified. That is, when the multiwavelength light contains a plurality of channels, the signals along the plurality of channels having different wavelengths are collectively amplified. The amplification factor of an optical fiber amplifier normally depends on the wavelength. Therefore, the amplification factor for the multiwavelength light depends on the wavelength, and accordingly each channel may have a different optical level.

A variable optical attenuator can be provided at a preceding or succeeding stage of the optical fiber amplifier. The attenuation of the variable optical attenuator also depends on the wavelength. Some other passive devices also depend on the wavelength.

These factors cause deviations in optical levels. That is, different wavelengths result in different optical levels. Although the deviation in optical level caused in a single optical fiber amplifier is small, the optical level is lowered in a channel of a specific signal wavelength, thereby lowering the signal-to-noise ratio, when more than ten optical fiber amplifiers are provided for a long-distance transmission using an inter-continental submarine cable, and the above described optical level deviations are cumulative.

A technology for solving the above described problem is disclosed in, for example, Tokukaihei 7-202306 in the Japanese Official Gazette. The optical amplifier published in Tokukaihei 7-202306 is designed as two serial optical fiber amplifiers having different wavelength dependencies. The excitation light applied to the above described two optical fiber amplifiers is controlled to obtain an equal total gain of an optical signal or an equal output optical level for each wavelength.

However, with the configuration disclosed by Tokukaihei 7-202306, it is difficult to control two excitation light levels in such a way that equal output optical levels can be obtained for each wavelength. Additionally, it is required to keep a constant level of an output signal in the optical transmission system. Although Tokukaihei 7-202306 does not specifically disclose the technology for keeping a constant level of an output signal, it must be rather complicated with the configuration described in Tokukaihei 7-202306 to execute control to obtain equal output optical levels for each wavelength (equalization) and simultaneously execute control to keep the level of an output signal constant, because the functions of the optical fiber amplifiers for these control processes are not clarified.

SUMMARY OF THE INVENTION

The present invention aims at providing an amplifier for keeping a constant optical output level and equalizing output levels of a plurality of wavelength elements. The present invention also aims at easily executing control as described above with the above described technologies.

The optical equalizing amplifier according to the present invention comprises a variable optical attenuator for adjusting the optical level of a multiwavelength light, an optical fiber amplifying unit for amplifying the multiwavelength light output from the variable optical attenuator, a light source for providing the optical fiber amplifying unit with an excitation light, and a control unit for controlling the light intensity of the light source in such a way that the optical level of the multiwavelength light output from the optical fiber amplifying unit is kept constant, and for controlling the attenuation of the variable optical attenuator so as to equalize the multiwavelength light output from the above described optical fiber amplifying unit.

The gain characteristic of the optical fiber amplifying unit alters with the excitation ratio. The excitation ratio depends on the input level of a multiwavelength light and the intensity of an excitation light. The gain balance is controlled by providing the variable optical attenuator at the input terminal of the optical fiber amplifying unit to change the input levels of the multiwavelength light. The output level is controlled by changing the intensity of an excitation light source.

BRIEF DESCRIPTION OF THE DRAWINGS

FIG. 5 shows the configuration of the optical equalizing amplifier according to the first embodiment;

FIGS. 11A(1), 11A(2), and 11A(3) show the control of the AGBC where the output signals are equalized;

FIGS. 11B(1), 11B(2), and 11B(3) show the control of the AGBC where the output signals are not equalized;

FIG. 19 shows the configuration of the optical equalizing amplifier according to the seventh embodiment of the present invention;

FIG. 23 shows the configuration of the optical equalizing amplifier according to the ninth embodiment of the present invention;

FIG. 26 shows an example of the configuration of the control information storage table;

DETAILED DESCRIPTION OF THE INVENTION

The basic configuration of the present invention is described by referring to FIG. 2. The optical equalizing amplifier according to the present invention equalizes and amplifies a multiwavelength light. The multiwavelength light includes a wavelength division multiplexed optical signal, which is obtained by multiplexing a plurality of optical signals each having different wavelengths.

Figure 2A:
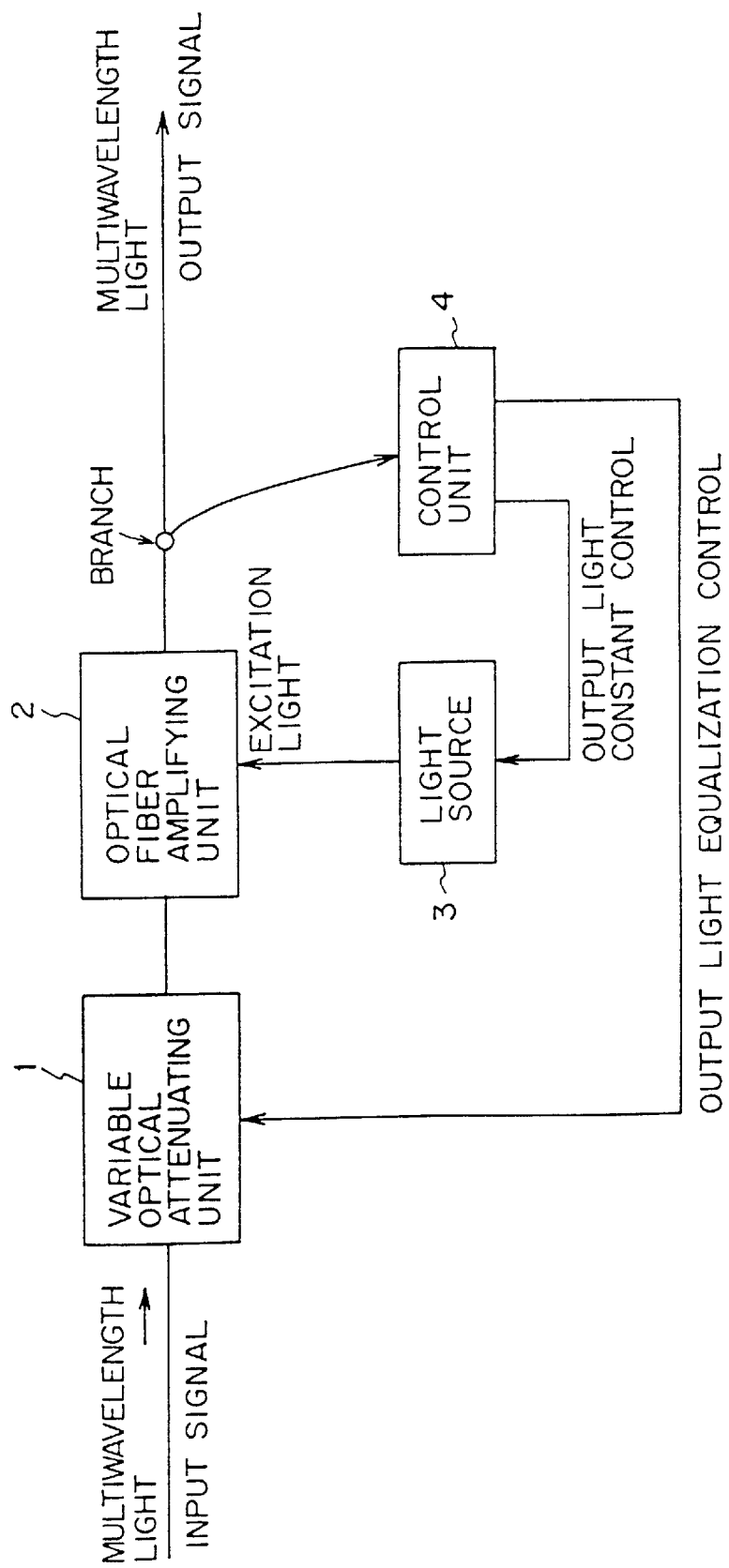
FIG. 2A shows the basic configuration (1) of the optical fiber amplifier according to the present invention.

The first aspect of the optical equalizing amplifier according to the present invention is configured as shown in FIG. 2A. A variable optical attenuating unit 1 adjusts the optical level of a multiwavelength light. An optical fiber amplifying unit 2 amplifies the multiwavelength light output from the variable optical attenuating unit 1. A light source 3 provides the optical fiber amplifying unit 2 with an excitation light. A control unit 4 controls the excitation light such that the optical level of the multiwavelength light output from the optical fiber amplifying unit 2 is kept constant, and controls the variable optical attenuating unit 1 such that the multiwavelength light output from the optical fiber amplifying unit 2 is equalized. Here, equalizing the multiwavelength light is to obtain equal optical levels for each of the wavelengths.

The optical gain of the optical fiber amplifying unit 2 depends on the wavelength. The wavelength characteristics relating to the optical gain depend on the optical level of the excitation light, and also depend on the optical level of the optical signal (multiwavelength light) input to the optical fiber amplifying unit 2. Therefore, suitably controlling these two optical levels equalizes the output signal levels in relation to the wavelength, and keeps a predetermined constant output optical level.

According to the above described first aspect of the present invention, the output signal is equalized by adjusting the optical level of the optical signal (multiwavelength light) input to the optical fiber amplifying unit 2. The optical level of the optical signal input to the optical fiber amplifying unit 2 is adjusted by controlling the attenuation of the variable optical attenuating unit 1. The controlling operation is performed to keep the output signal at a constant level by controlling the excitation light for exciting the optical fiber amplifying unit 2.

Figure 2B:
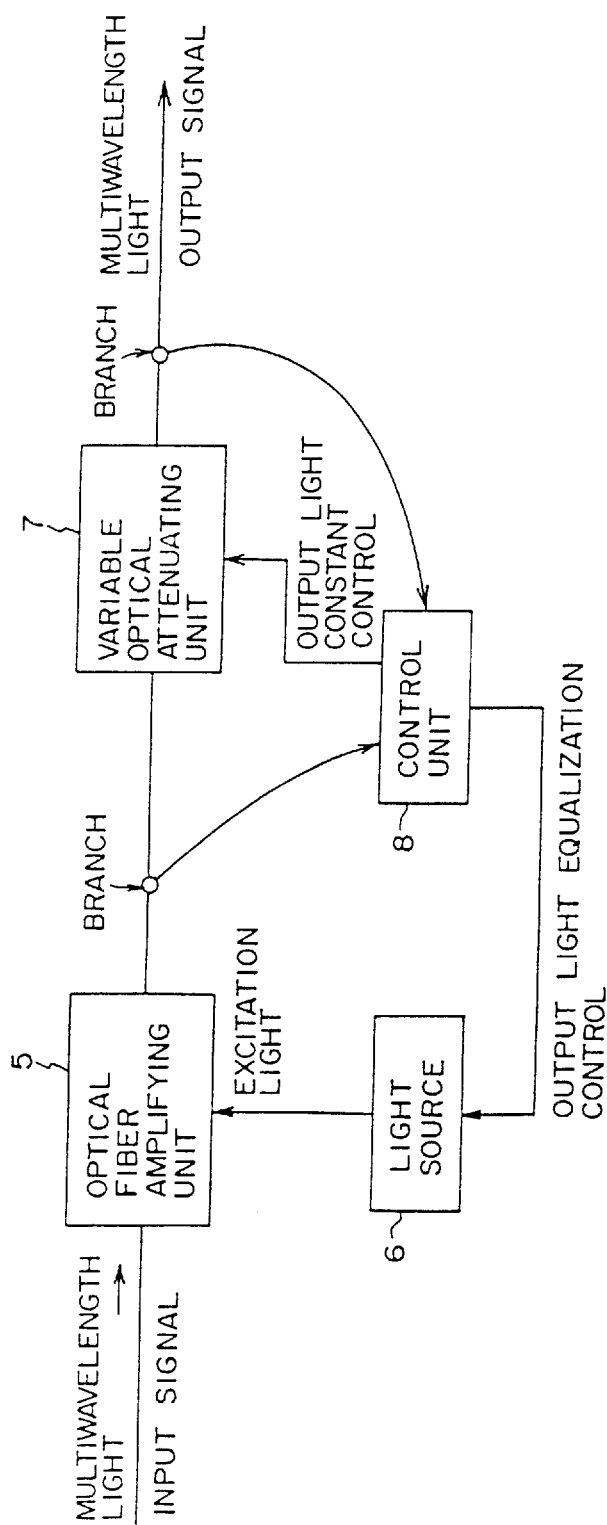
FIG. 2B shows the basic configuration (2) of the optical fiber amplifier according to the present invention.

The second aspect of the optical equalizing amplifier according to the present invention is configured as shown in FIG. 2B. An optical fiber amplifying unit 5 amplifies a multiwavelength light. A light source 6 provides the optical fiber amplifying unit 5 with an excitation light. A variable optical attenuating unit 7 adjusts the optical level of the multiwavelength light. A control unit 8 controls the above described excitation light such that the multiwavelength light output from the optical fiber amplifying unit 5 are equalized, and controls the variable optical attenuating unit 7 such that the optical level of the multiwavelength light output from the variable optical attenuating unit 7 is kept constant.

According to the second aspect of the present invention, the amplification characteristics of the optical fiber amplifying unit 5 is changed by controlling the intensity of the excitation light output from the light source 6, thereby equalizing the output signals. The controlling operation is performed to keep the output signal at a constant level by controlling the attenuation of the variable optical attenuating unit 7.

Since the function of equalizing output signals is clearly distinguished from the function of keeping a constant level of an output signal according to the first and second aspects of the present invention, it is easy to design and control each function.

The embodiments of the present invention are explained below by referring to the attached drawings. In the following explanation, the wavelength of an optical signal in transmitting a signal is 1.55 µm, and a rare-earth doped optical fiber amplifier is explained as one of the optical fiber amplifiers. The rare-earth doped optical fiber can be an optical fiber to which erbium, etc. is applied.

Figure 3:
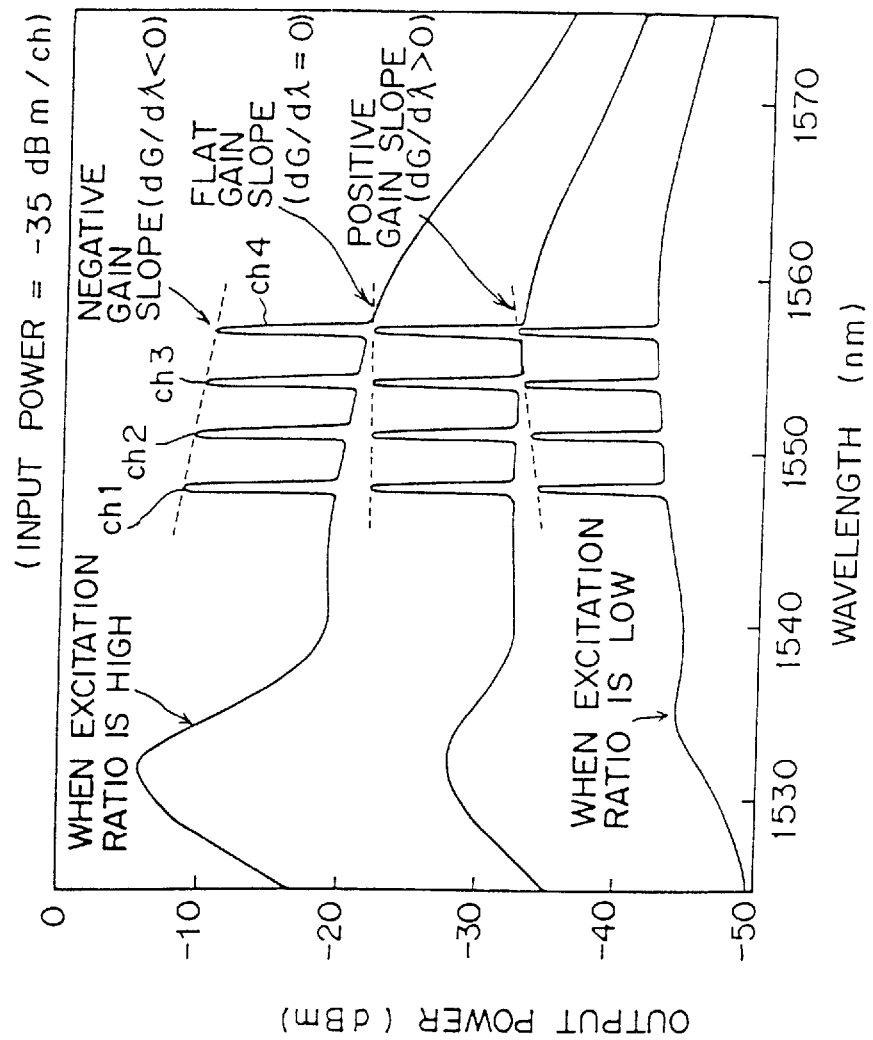
FIG. 3 shows the characteristics of the wavelength of the optical gain of the rare-earth doped optical fiber amplifier.

Before explaining the configuration of the optical equalizing amplifier according to the present invention, the concept of the present invention will be described first. FIG. 3 shows the wavelength characteristics of the optical gain of an erbium doped optical fiber amplifier. In the erbium doped optical fiber amplifier, the gain at a longer wavelength is smaller due to the strong influence of the emission cross section characteristics when the excitation ratio (Er inverted population ratio) is high. When the excitation ratio is low, the influence of the absorption cross section characteristics is strong, thereby reducing the gain at a shorter wavelength. That is, when the excitation ratio is high, the slope of the gain to the wavelength is negative, while the slope of the gain is positive when the excitation ratio is low.

The optical equalizing amplifier according to the present invention utilizes the above described characteristics. That is, the optical levels of two or more wavelengths (wavelengths that carry signals) contained in the multiwavelength light output from the optical equalizing amplifier are detected. Based on the detection result, the wavelength characteristics (optical gains) are amended by changing the excitation ratio of a rare-earth doped optical fiber, thereby equalizing the output levels. That is, controlling the excitation ratio of the rare-earth doped optical fiber equalizes each optical level of a plurality of wavelengths carrying signals.

There are two methods of changing an excitation ratio, that is, a method of controlling the intensity of an excitation light, and a method of controlling the optical level of an optical signal input to the optical equalizing amplifier. When the intensity of the excitation light is controlled, the output of the optical equalizing amplifier is fed back to the light source which generates the excitation light. When the input level of the optical signal is controlled, a variable optical attenuator is provided at the input terminal of a rare-earth doped optical fiber and the output of the optical equalizing amplifier is fed back to the variable optical attenuator.

Some erbium doped optical fiber amplifiers indicate a linear change in optical gain to wavelength in an amplified wavelength band as shown in FIG. 3. Based on this characteristic, it is expected that the optical levels of all channels match if the detection levels in a plurality of (at least two) wavelength bands match in the wavelength band containing the optical signal. When, of the plural detection levels, the level of the wavelength band containing the shortest wavelength of the optical signal matches the level of the wavelength band containing the longest wavelength of the optical signal, the smallest difference is expected among the output levels of the wavelength bands.

Figure 4:
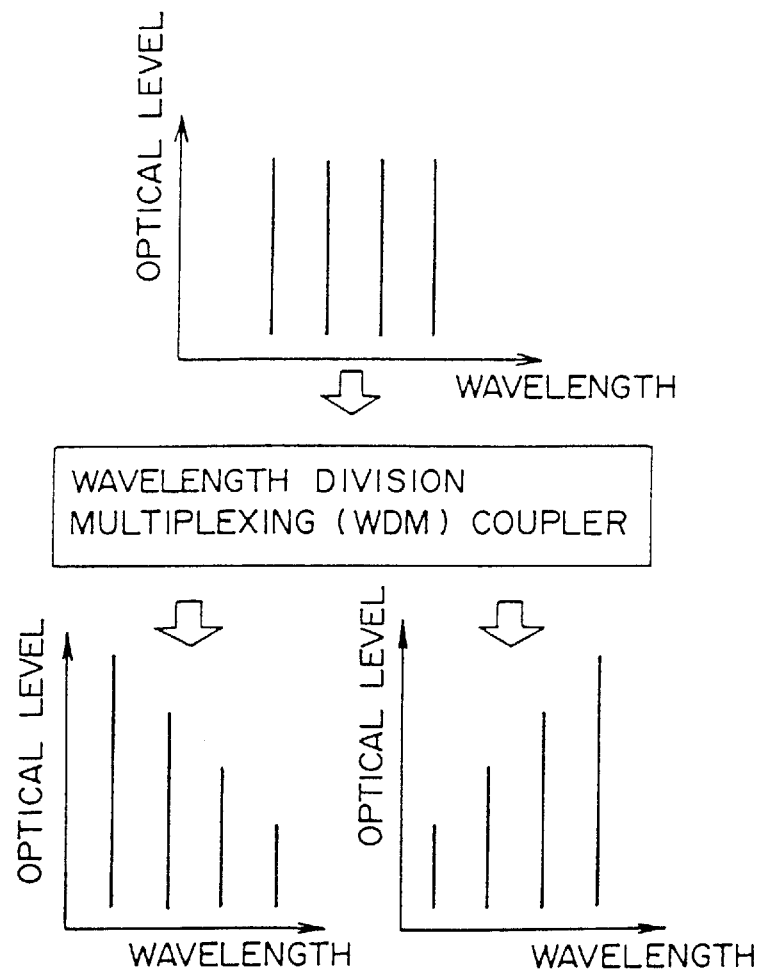
FIG. 4 shows the concept of demultiplexing wavelength.

To realize the above described technology, for example, a wavelength division multiplexing coupler (WDM coupler) is mounted. The wavelength division multiplexing coupler has a plurality of transmission wavelength band patterns and makes an input signal branch depending on the pattern. FIG. 4 shows an example in which an input signal is divided into two through a wavelength division multiplexing coupler having one transmission wavelength band pattern for selecting shorter wavelengths (obtaining a higher transmittance with a shorter wavelength), and another transmission wavelength band pattern for selecting longer wavelengths (obtaining a higher transmittance with a longer wavelength). When an equalized multiwavelength light is demultiplexed by the wavelength division multiplexing coupler, one output generates a light having a high optical level at a shorter wavelength and another output generates a light having a high optical level at a longer wavelength as shown in FIG. 4. The wavelength division multiplexing coupler is a well-known device, and is explained later in detail as to how it is to be applied in the present embodiment.

Figure 1:
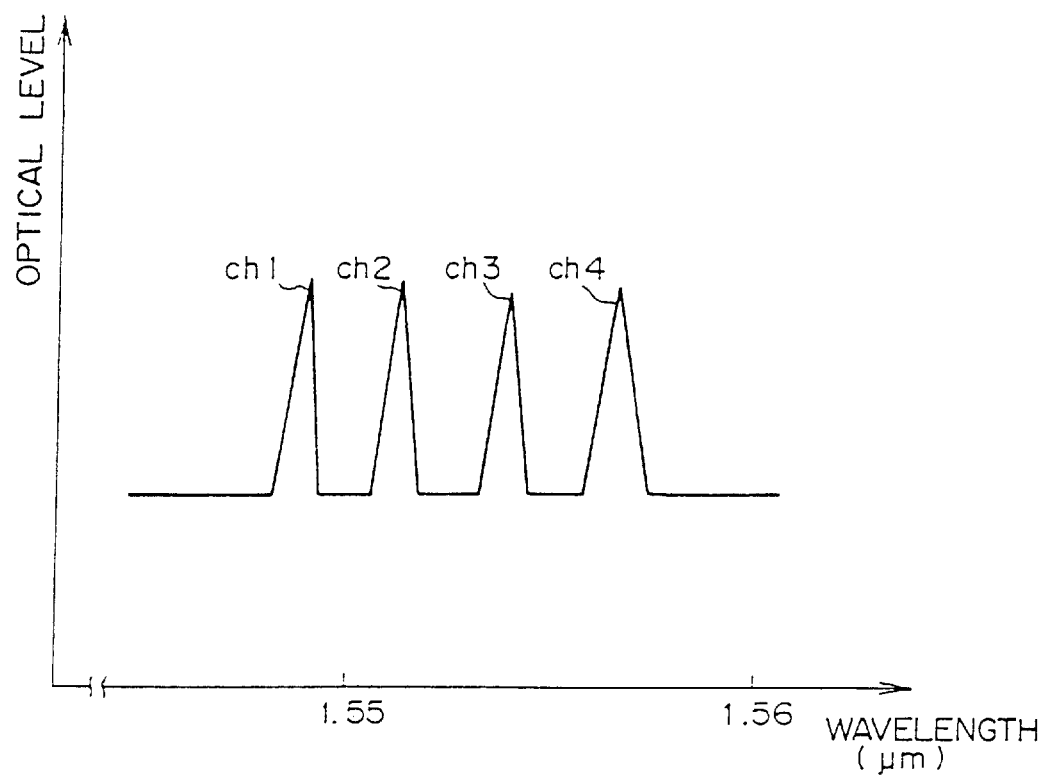
FIG. 1 shows the relationship between the wavelength and the optical level in the wavelength division multiplexing transmission.

Described below are the first through ninth embodiments of the present invention. The optical equalizing amplifier of each embodiment is described as equalizing and amplifying a multiwavelength light including multiplexed four channels (ch 1 through ch 4) shown in FIG. 1 or 3.

FIG. 5 shows the configuration of the optical equalizing amplifier according to the first embodiment. The optical equalizing amplifier according to the first embodiment is provided with a variable optical attenuator (ATT) before the optical amplifier. The optical gain balance is automatically controlled by controlling the attenuation of the variable optical attenuator. The optical output can be kept at a constant level by controlling the optical intensity of an excitation light which excites a rare-earth doped optical fiber in the light amplifier.

A variable optical attenuator 11 attenuates the multiwavelength light input using the attenuation determined by the control of an automatic gain balance control (AGBC) circuit 12. The output signal from the variable optical attenuator 11 is input to a rare-earth doped optical fiber 21.

Figure 6:
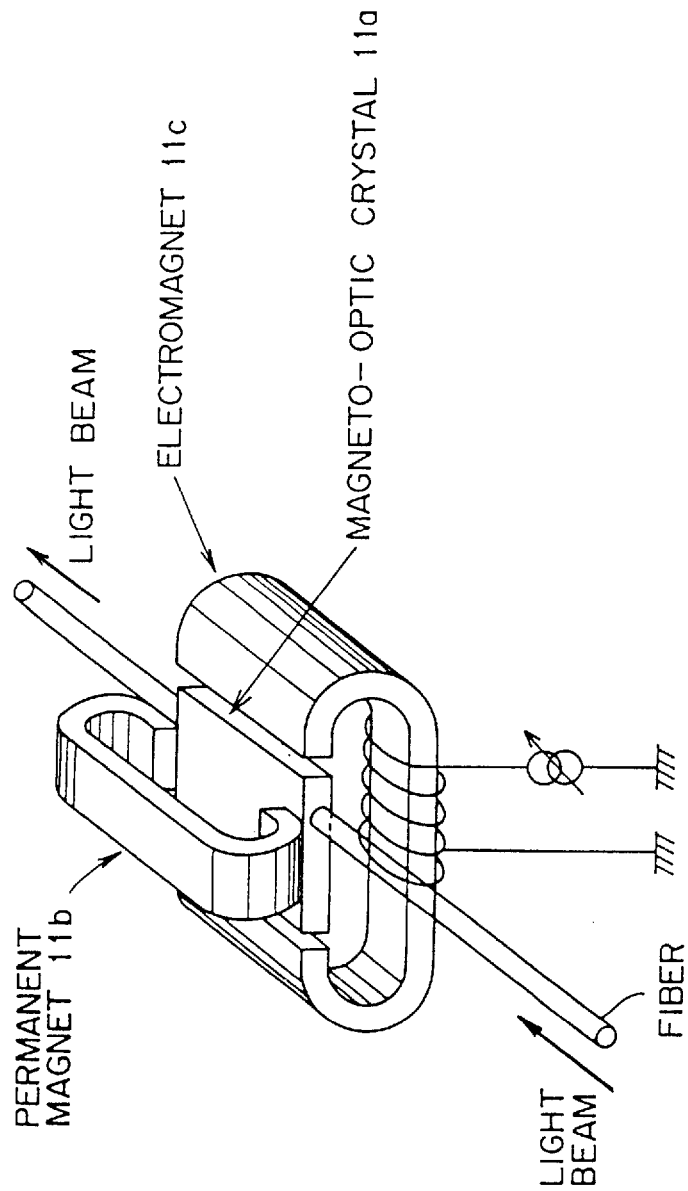
FIG. 6 shows the configuration of the variable optical attenuator to which a Faraday rotator is applied.

The variable optical attenuator 11 is realized by a Faraday rotator based on a magneto-optic effect. FIG. 6 shows the configuration of a variable optical attenuator using a Faraday rotator.

A light passes through a magneto-optic crystal 11a. A fixed magnetic field is applied to the magneto-optic crystal 11a by a permanent magnet 11b, and a variable magnetic field is applied to the magneto-optic crystal 11a by an electromagnet 11c. The magnetic field with the electromagnet 11c is controlled by a coil current.

Figure 7A:
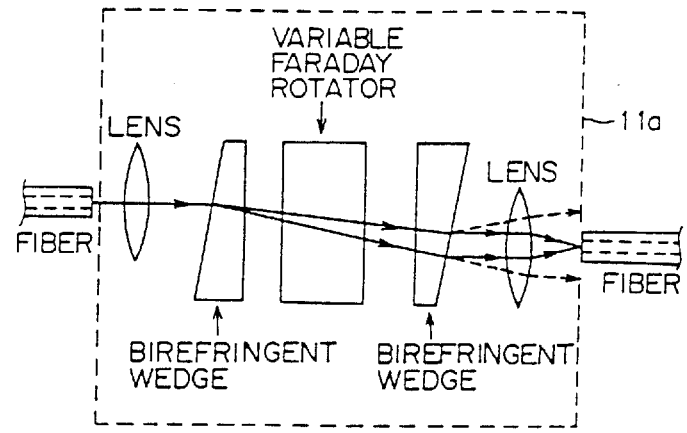
FIG. 7A shows the configuration of the Magneto-optic crystal.
Figure 7B:
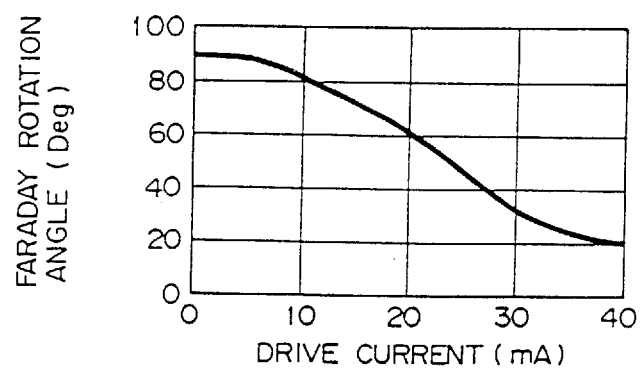
FIG. 7B shows the relationship between the drive current and the Faraday rotation angle.
Figure 7C:
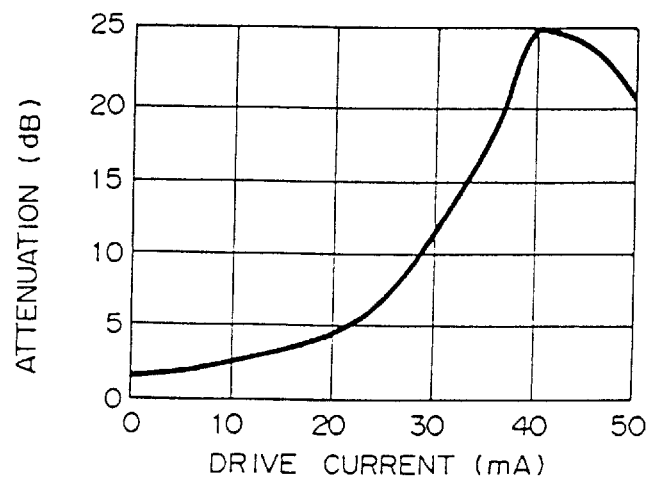
FIG. 7C shows the relationship between the drive current and optical attenuation.

FIGS. 7A through 7C show the optical attenuation using a Faraday rotator. To alter the optical attenuation, the coil current (drive current) is changed. When the drive current alters, a Faraday rotation angle changes as shown in FIG. 7B. The magneto-optic crystal 11a has a Faraday rotator between two birefringent wedges as shown in FIG. 7A. The quantity of light that reaches the input cross section of an optical fiber at an output terminal alters with the Faraday rotation angle. Therefore, the quantity of light transmitted through the magneto-optic crystal 11a can be controlled by a drive current. That is, the attenuation of an optical signal can be controlled by a drive current. The variable optical attenuator 11 is not always based on a magneto-optical effect. For example, it can be based on an electro-optical effect such as $LiNbO_3$, an acousto-optical effect, etc.

The rare-earth doped optical fiber 21 is an optical fiber doped with a rare-earth such as erbium, etc. and excited by an excitation light generated by a light source (pump) 26. Using the excitation energy, an input signal (multiwavelength light) is amplified. The optical gain in the rare-earth doped optical fiber 21 depends on the excitation ratio. The excitation ratio depends on the intensity of an excitation light and the input level of an input signal. When the input level of a multiwavelength light is constant, the higher the intensity of the excitation light, the higher the excitation ratio becomes. When the intensity of the excitation light is constant, the higher the input level of a multiwavelength light, the lower the excitation ratio becomes. As described by referring to FIG. 3, the slope of optical gain to wavelength is negative when the excitation ratio is high, and it is positive when the excitation ratio is low.

The rare-earth doped optical fiber 21 receives a mixture of an optical signal (a multiwavelength light output from the variable optical attenuator 11) and an excitation light (output from the light source 26) from an optical coupler 30.

A portion of the multiwavelength light output to the optical fiber 13 (optical fiber at the output terminal) is split by an optical splitter 22, and is transmitted to a further optical splitter 23. Each of the optical splitters 22 and 23 can be comprised by optical coupler. Since the optical splitter 22 simply splits the multiwavelength light, the wavelength characteristics of the multiwavelength light output to an optical fiber 13 are similar to those of the multiwavelength light transmitted to the optical splitter 23. However, the quantity of light transmitted to the optical splitter 23 is significantly smaller than that output to the optical fiber 13.

The optical splitter 23 splits the multiwavelength light from the optical splitter 22 at a predetermined ratio, transmits one portion to the photodiode 24 and another to a wavelength division multiplexing coupler (WDM coupler) 27.

The photodiode 24 converts a multiwavelength light received from the optical splitter 23 into an electric signal which is then input to an automatic level control (ALC) circuit 25. The output from the photodiode 24 depends on the level of the output signal from the optical splitter 23. Since the split ratios of the optical splitter 22 and optical splitter 23 are known, the ALC circuit 25 can detect the level of the output signal of the multiwavelength light output from the rare-earth doped optical fiber 21 (or on the optical fiber 13), by detecting the level of the multiwavelength light received from the optical splitter 23.

The ALC circuit 25 controls the light source 26 according to the output from the photodiode 24. That is, the ALC circuit 25 controls the light source 26 based on the output level (average optical level of a multiwavelength light) of the rare-earth doped optical fiber 21. The configuration of the ALC circuit 25 will be described later. The light source 26 determines the light intensity under the control of the ALC circuit 25, and inputs the excitation light to the rare-earth doped optical fiber 21.

The ALC circuit 25 determines the intensity of the excitation light using the output level of the rare-earth doped optical fiber 21 as a feedback signal, and controls the output level of the rare-earth doped optical fiber 21 to be constant. That is, the ALC circuit 25 controls the excitation light of the light source 26 in such a way that the output level of the rare-earth doped optical fiber 21 indicates a constant value.

The optimum output level should be kept constant for the following reason. That is, when an output level is too high, an outstanding nonlinear effect is detected on the optical fiber 13, thereby distorting the waveform of a signal. When the output level is too low, the transmission distance of an optical signal is shortened. Therefore, it is important to keep the optimum output level constant.

Figure 8A:
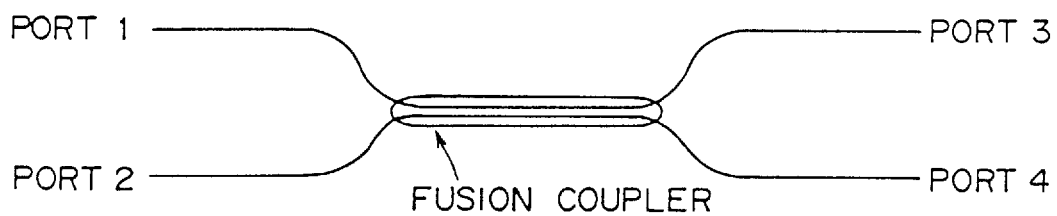
FIG. 8A shows an example of a wavelength division multiplexing coupler.
Figure 8B:
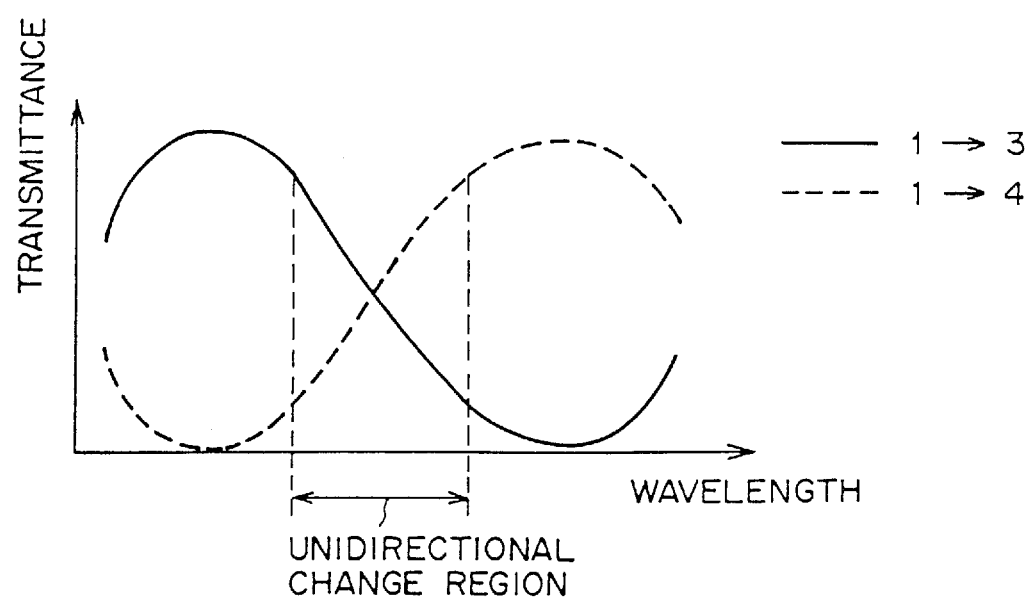
FIG. 8B shows the characteristics of the coupler shown in FIG. 8A.

The wavelength division multiplexing coupler 27 has the characteristics described above with reference to FIG. 4. The wavelength division multiplexing coupler 27 in this example is realized by a 2-input/2-output fusion coupler as shown in FIG. 8A. In this case, for example, an optical signal input through port 1 is output to ports 3 and 4. The transmission wavelength characteristics (wavelength dependency of the optical transmittance) in each route are different from each other, as shown in FIG. 8B. The wavelength division multiplexing coupler 27 is formed in such a way that a wavelength region (unidirectional change region shown in FIG. 8B) in which the transmittance indicates a unidirectional increase or decrease is the optimum wavelength region for signal transmission.

When the wavelength division multiplexing coupler 27 is configured as shown in FIG. 8A, an output signal from the optical splitter 23 is received by port 1, and the output signals from ports 3 and 4 are respectively transmitted to photodiodes 28 and 29. With this configuration, the photodiode 28 is provided with an optical signal in which shorter wavelength components are transmitted comparing with the shorter wavelength components and longer wavelength components are not transmitted, whereas the photodiode 29 is provided with an optical signal in which longer wavelength components are transmitted and shorter wavelength components are not transmitted comparing with the longer wavelength components, in a wavelength region in which a signal is transmitted.

The photodiodes 28 and 29 convert the optical signals received from the wavelength division multiplexing coupler 27 into electrical signals, and transmit the electrical signals to the AGBC circuit 12. That is, the photodiodes 28 and 29 provide the AGBC circuit 12 with the optical levels of the optical signals in which shorter wavelength components have been transmitted and the optical levels of the optical signals in which longer wavelength components have been transmitted, of the output signals from the optical splitter 23. Since the optical splitters 22 and 23 split the collectively input multiwavelength lights as described above, the wavelength characteristics of an optical signal output from the optical splitter 23 are similar to the wavelength characteristics of an optical signal output from the rare-earth doped optical fiber 21 (or on the optical fiber 13). Therefore, the AGBC circuit 12 recognizes the optical levels of the optical signals in which shorter wavelength components have been transmitted and the optical levels of the optical signals in which longer wavelength components have been transmitted, of the optical signals output from the rare-earth doped optical fiber 21.

The AGBC circuit 12 controls the attenuation of the variable optical attenuator 11 in such a way that the optical level output from the photodiode 28 is similar to the optical level output from the photodiode 29. That is, the AGBC circuit 12 controls the attenuation of the variable optical attenuator 11 such that the shorter and longer wavelength components of the multiwavelength light output from the rare-earth doped optical fiber 21 are similar to each other. The configuration of the AGBC circuit 12 will be described later.

Figure 9:
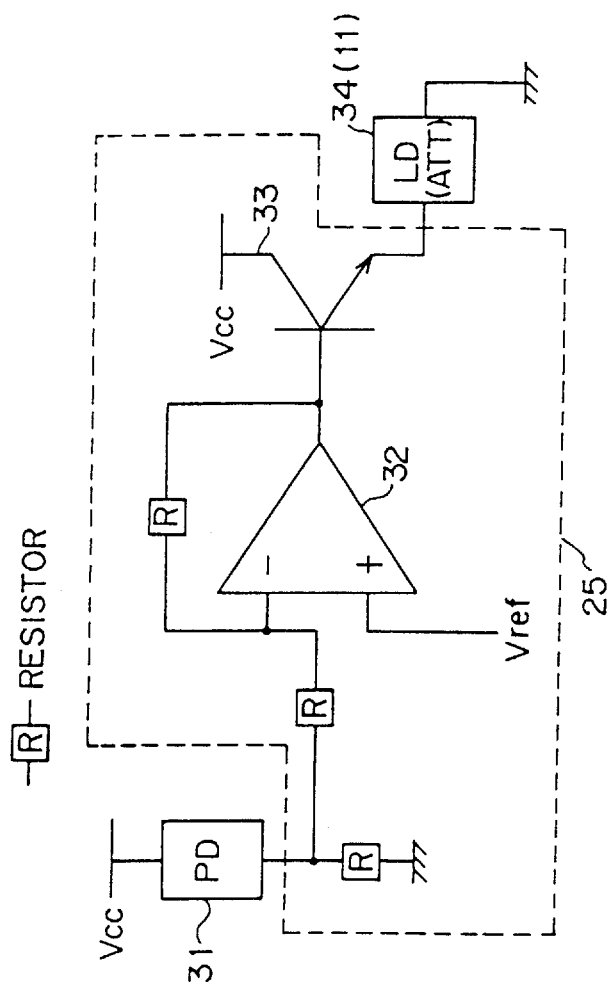
FIG. 9 shows an example of the configuration of the ALC (automatic level control) circuit.

FIG. 9 shows an example of the configuration of the automatic level control (ALC) circuit 25. A photodiode 31 is a photoelectric element for detecting an optical level, and corresponds to the photodiode 24 shown in FIG. 5. The output of the photodiode 31 is applied to the inverting input terminal of an operational amplifier 32, and a reference voltage is applied to the non-inverting input terminal of the operational amplifier 32. The output of the operational amplifier 32 controls the electric current flowing through a power transistor 33. A semiconductor laser 34 is driven by the power transistor 33. The semiconductor laser 34 corresponds to the light source 26 shown in FIG. 5. The semiconductor laser 34 outputs a light with an intensity dependant on the drive current flowing through the power transistor 33. This light output is an excitation light provided for the rare-earth doped optical fiber 21 shown in FIG. 5.

The operational amplifier 32 is part of a feedback system which requires the potential of an inverting input terminal to match the reference voltage. That is, the ALC circuit automatically controls the light intensity of the semiconductor laser 34 (light source 26) such that the optical signal level detected by the photodiode 31 (photodiode 24) matches a value predetermined by the reference voltage.

The ALC circuit keeps the output level of the rare-earth doped optical fiber 21 at an optimum constant value. For example, when the output level of the rare-earth doped optical fiber 21 is lower than a predetermined value, the optical level of the optical signal input to the photodiode 24 (31) becomes lower. As a result, the voltage applied to the inverting input terminal of the operational amplifier 32 also becomes lower. The operational amplifier 32 changes its output to equalize the potential applied to the inverting input terminal with the potential (reference voltage) applied to the non-inverting input terminal. Thus, the electric current flowing through the power transistor 33 becomes higher, and the light intensity of the semiconductor laser 34 (light source 26) becomes higher. Since the output light of the light source 26 is an excitation light provided for the rare-earth doped optical fiber 21, the amplification ratio of the rare-earth doped optical fiber 21 increases with the light intensity. As a result, the output level of the rare-earth doped optical fiber 21 becomes higher. Thus, the output level of the rare-earth doped optical fiber 21 is made to match a predetermined value.

Figure 10:
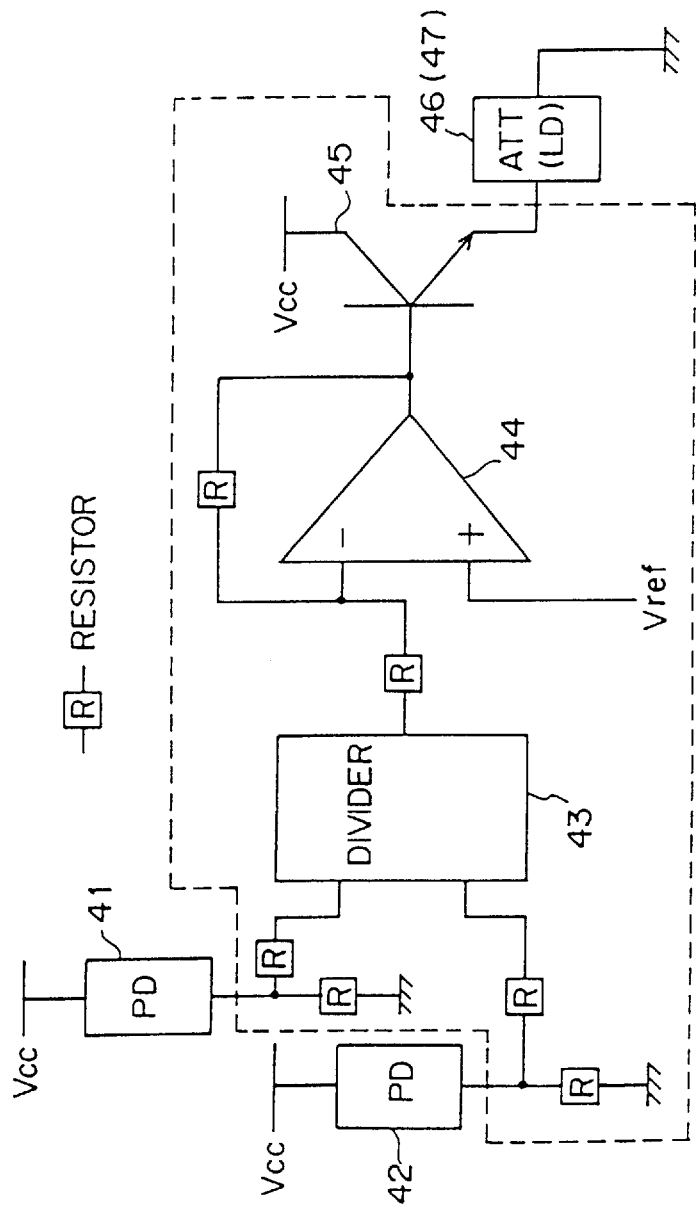
FIG. 10 shows an example of the configuration of the AGBC (automatic gain balance control) circuit.

FIG. 10 shows an example of the configuration of the automatic gain balance control (AGBC) circuit. Photodiodes 41 and 42 are photoelectric elements for detecting the optical levels of different wavelength bands, and correspond to the photodiodes 28 and 29 shown in FIG. 5. A divider 43 computes the ratio between the optical levels detected by the photodiodes 41 and 42. The output from the divider 43 is applied to the inverting input terminal of an operational amplifier 44, and a reference voltage is applied to the non-inverting input terminal of the operational amplifier 44. The output of the operational amplifier 44 controls the electric current flowing through a power transistor 45. The attenuation of a variable optical attenuator 46 is controlled by the electric current flowing through the power transistor 45. The variable optical attenuator 46 corresponds to the variable optical attenuator 11 shown in FIG. 5.

The operational amplifier 44 is part of a feedback system which requires the potential of an inverting input terminal to match the reference voltage. Therefore, the optical levels detected by the photodiodes 41 and 42 (photodiodes 28 and 29) can be controlled to match each other by properly selecting the reference voltage. That is, the AGBC circuit automatically controls the attenuation of the variable optical attenuator 46 (variable optical attenuator 11) in such a way that the optical levels of the different wavelength bands match each other.

The Automatic Gain Balance Control circuit (12) is explained by referring to FIG. 11. First, the method of setting the reference voltage will be described.

FIGS. 11A(1), 11A(2) and 11A(3) show an example of the state in which the output signal of the rare-earth doped optical fiber 21 is equalized. Since the wavelength division multiplexing coupler 27 divides a portion of the output signal from the rare-earth doped optical fiber 21 into an optical signal obtained by transmitting short wavelength components and an optical signal obtained by transmitting long wavelength components, the photodiode 28 (41) and the photodiode 29 (42) receive the optical signals having the characteristics shown in FIGS. 11A(2) and 11A(3), respectively.

The photodiode 28 (41) and photodiode 29 (42) convert respective input levels into electrical signals and output them. The divider 43 computes the ratio of the output value of the photodiode 28 (41) to the output value of the photodiode 29 (42), and a voltage depending on the calculation result is applied to the inverting input terminal of the operational amplifier 44.

The reference voltage is preliminarily adjusted to match the voltage applied to the inverting input terminal of the operational amplifier 44 with the output signal of the rare-earth doped optical fiber 21 equalized in consideration of the characteristics of the wavelength division multiplexing coupler 27 and the conversion characteristics of the photodiode 28 (41) and photodiode 29 (42). For example, if the output value from the photodiode 28 (41) is equal to the output value from the photodiode 29 (42), according to the aspect shown in FIGS. 11A(1), 11A(2) and 11A(3) then the output of the divider 43 is '1'. Assume that the voltage applied to the inverting input terminal of the operational amplifier 44 is 1V when the output from the divider 43 is '1'. In this case, the reference voltage is set to 1V.

Described below is the operation of the AGBC circuit 12 when the optical signal output from the rare-earth doped optical fiber 21 is not equalized. Assume that the output signal from the rare-earth doped optical fiber 21 indicates a high level for shorter wavelength components and a low level for the longer wavelength components as shown in FIG. 11B(1). This state arises when the excitation ratio of the rare-earth doped optical fiber 21 is too high as shown in FIG. 3. The AGBC circuit 12 controls the gain of the rare-earth doped optical fiber 21 to be an appropriate value by lowering the excitation ratio of the rare-earth doped optical fiber 21.

When the output signal from the rare-earth doped optical fiber 21 indicates the state as shown in FIG. 11B, the multiwavelength light received by the photodiode 28 (41) and photodiode 29 (42) indicates the state as shown in FIGS. 11B(2) and 11B(3), respectively, unlike the case shown in FIGS. 11A(1), 11A(2) and 11A(3). In this case, the output value from the photodiode 28 (41) is larger than the output value from the photodiode 29 (42). Therefore, the output from the divider 43 is larger than 1, and the voltage applied to the inverting input terminal of the operational amplifier 44 becomes larger than 1V. That is, the voltage applied to the inverting input terminal of the operational amplifier 44 becomes larger than the reference voltage (1V).

The feedback control system including the operational amplifier 44 reduces the drive current of the variable optical attenuator 46 (11) to reduce the attenuation of the optical signal to thereby make the voltage applied to the inverting input terminal match the reference voltage. If the drive current of the variable optical attenuator 46 (11) has been reduced, the attenuation becomes lower as shown in FIG. 7C. Therefore, the optical level of an optical signal input to the rare-earth doped optical fiber 21 becomes higher. When the optical level of an optical signal to be amplified becomes higher, the excitation ratio of the rare-earth doped optical fiber 21 becomes lower. When the excitation ratio of the rare-earth doped optical fiber 21 becomes lower, the ratio of the optical gain for longer wavelength optical signals to the optical gain for shorter wavelength optical signals becomes relatively large as described above by referring to FIG. 3.

That is, when the rare-earth doped optical fiber 21 outputs a multiwavelength light indicating a high level for shorter wavelength components and a low level for longer wavelength components, the gain slope of the rare-earth doped optical fiber 21 can be amended in the positive direction by reducing the attenuation of the variable optical attenuator 46 (11) to make the output level for longer wavelength components relatively higher than the output level for shorter wavelength components. Through the amendments of the gain of the rare-earth doped optical fiber 21, the output signal from it is equalized. When the state shown in FIG. 11A is realized, the voltage applied to the inverting input terminal of the operational amplifier 44 matches the reference voltage. Therefore, the drive current of the variable optical attenuator 46 (11) is kept in this state.

If the rare-earth doped optical fiber 21 outputs a multi-wavelength light indicating a low level for shorter wavelength components and a high level for longer wavelength components, the gain slope of the rare-earth doped optical fiber 21 can be amended in the negative direction by increasing the attenuation of the variable optical attenuator 46 (11) to equalize the multiwavelength light.

Thus, the optical equalizing amplifier according to the first embodiment shown in FIG. 5 automatically controls the optical gain balance by controlling the attenuation of the variable optical attenuator provided before the optical amplifying unit, and equalizes an optical signal (multiwavelength light). Furthermore, the optical output can be kept at an optimum constant level by controlling the light intensity of an excitation light source for exciting a rare-earth doped optical fiber in an optical amplifying unit.

Figure 12:
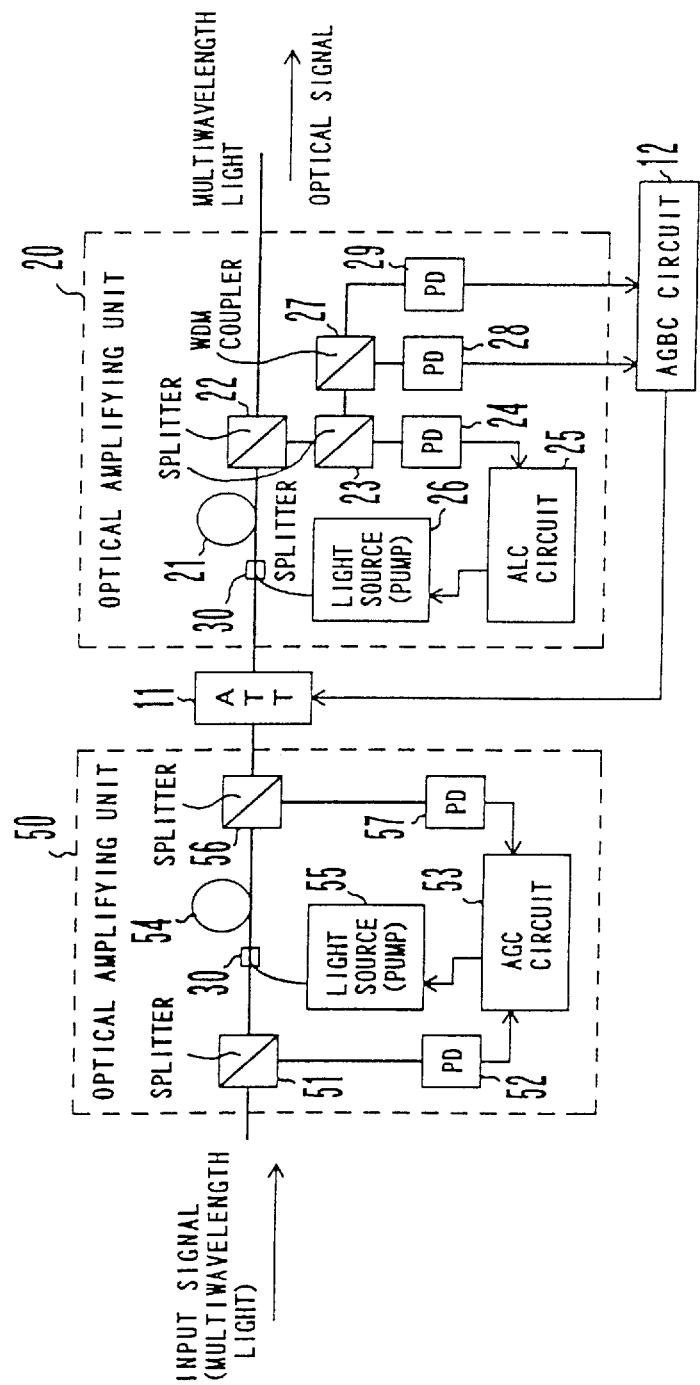
FIG. 12 shows the configuration of the optical equalizing amplifier according to the second embodiment of the present invention.

FIG. 12 shows the configuration of the optical equalizing amplifier according to the second embodiment of the present invention. The optical equalizing amplifier according to the second embodiment is designed to have an optical amplifying unit 50 before the optical equalizing amplifier of the first embodiment of the present invention. The optical amplifying unit 50 keeps the optical gain in a constant state. That is, the optical amplifying unit 50 keeps the ratio of the input signal level to the output signal level constant.

A splitter 51 splits a portion of an input multiwavelength light, and transmits it to a photodiode 52. The photodiode 52 converts a multiwavelength light received from the splitter 51 into an electrical signal and inputs it to an AGC circuit 53. The Automatic Gain Control (AGC) circuit 53 detects an input level of an input multiwavelength light according to a signal from the photodiode 52.

A rare-earth doped optical fiber 54 and a light source 55 are basically the same as the rare-earth doped optical fiber 21 and light source 26 respectively. A splitter 56 splits a portion of a multiwavelength light output from the rare-earth doped optical fiber 54 and inputs it to a photodiode 57. The photodiode 57 converts a multiwavelength light received from the splitter 56 into an electrical signal and inputs it to the AGC circuit 53. The AGC circuit 53 detects an output level of the multiwavelength light output from the rare-earth doped optical fiber 54 according to the signal from the photodiode 57.

The AGC circuit 53 computes an average gain of the rare-earth doped optical fiber 54 based on the input and output levels of the rare-earth doped optical fiber 54. That is, the AGC circuit 53 divides the "output level of the rare-earth doped optical fiber 54" by the "input level of the rare-earth doped optical fiber 54". The AGC circuit 53 controls the optical level of the excitation light generated by the light source 55 in such a way that the average gain of the rare-earth doped optical fiber 54 is kept constant. If the average gain is kept constant, it can be expected that the excitation ratio of the rare-earth doped optical fiber 54 is also kept constant. The "average gain" refers to the ratio of the input level to the output level of a multiwavelength light, and corresponds to an average gain per channel.

Figure 13:
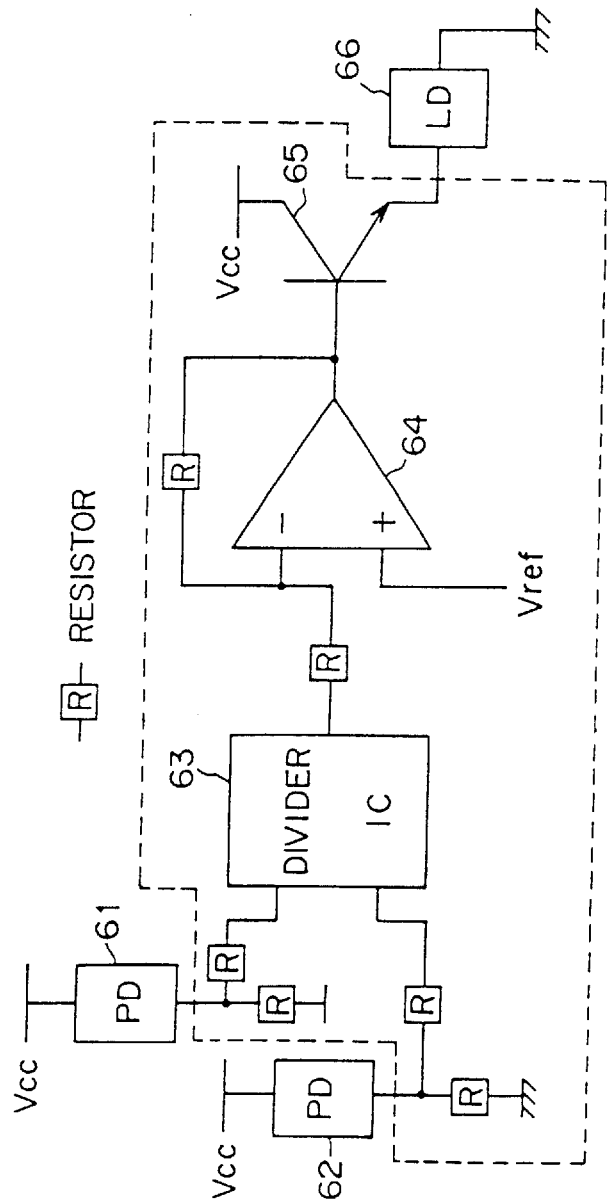
FIG. 13 shows an example of the configuration of the AGC (automatic gain control) circuit.

FIG. 13 shows an example of the configuration of the automatic gain control (AGC) circuit 53. The AGC circuit is basically the same in configuration as the AGBC circuit shown in FIG. 10.

Photodiodes 61 and 62 correspond to the photodiodes 52 and 57 shown in FIG. 12. That is, the photodiode 61 detects the input signal level of the rare-earth doped optical fiber 54 while the photodiode 62 detects the output signal level of the rare-earth doped optical fiber 54. A divider 63 obtains an average gain based on the ratio of each of the optical levels detected by the photodiodes 61 and 62 respectively. An operational amplifier 64 and a power transistor 65 is equal to the operational amplifier 44 and power transistor 45 in FIG. 10. A semiconductor laser 66 corresponds to the light source 55 in FIG. 12.

The feedback control system including the operational amplifier 64 controls the matching of the voltage applied to an inverting input terminal of the operational amplifier to the reference voltage. The voltage applied to the inverting input terminal of the operational amplifier 64 refers to an average gain of the rare-earth doped optical fiber 54. Therefore, the AGC circuit controls the light intensity of the semiconductor laser 66 such that the average gain may be set to a constant value depending on the reference voltage.

For example, if the average gain of the rare-earth doped optical fiber 54 is lowered, then the output from the photodiode 62 is relatively reduced, and the voltage applied to the inverting input terminal of the operational amplifier 64 is smaller than the reference voltage. In this case, the feedback control system including the operational amplifier 64 increases the drive current of the semiconductor laser 66 (light source 55) to increase the voltage to be applied to the inverting input terminal. As a result, the intensity of the excitation light to be provided to the rare-earth doped optical fiber 54 becomes higher, thereby increasing the average gain of the rare-earth doped optical fiber 54.

Thus, the optical amplifier according to the second embodiment of the present invention can expect an improvement of S/N (signal to noise) through the optical amplifying unit provided before the variable optical amplifier. Since there are two stages for the optical amplifying units, the optical output can be easily intensified.

Figure 14:
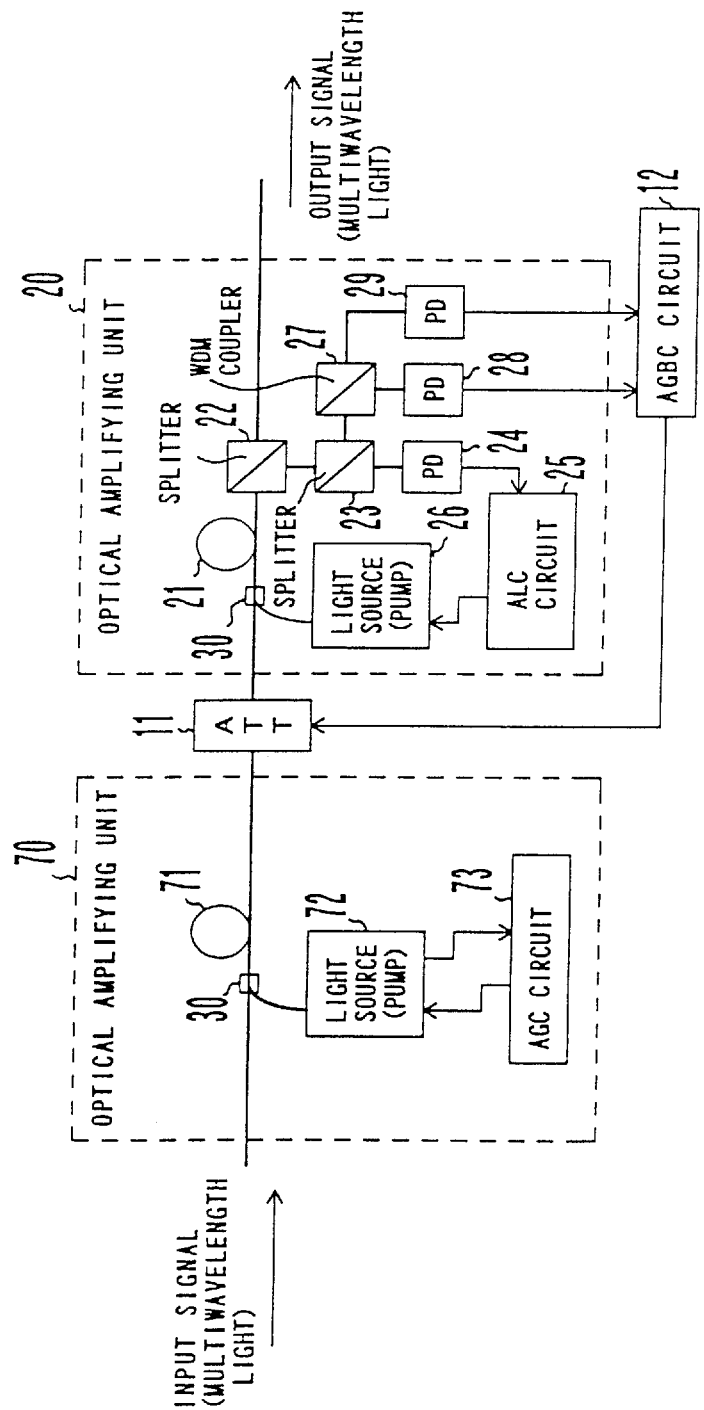
FIG. 14 shows the configuration of the optical equalizing amplifier according to the third embodiment.

FIG. 14 shows the configuration of the optical equalizing amplifier according to the third embodiment of the present invention. The optical equalizing amplifier according to the third embodiment is designed to have an optical amplifying unit 70 before the optical equalizing amplifier of the first embodiment of the present invention. The optical amplifying unit 70 amplifies an input signal while keeping the intensity of the excitation light at a constant level.

A light source 72 determines the light intensity under the control of an automatic power control (APC) circuit 73, and provides an excitation light for a rare-earth doped optical fiber 71. The gain deviation generated by the optical amplifying unit 70 is absorbed in an optical amplifying unit 20 under the control of the AGBC circuit 12.

Noise can be reduced if the light intensity of the excitation light of the optical amplifying unit 70 is constantly kept at a high value in the optical equalizing amplifier according to the third embodiment. The optical amplifying unit 70 amplifies an input signal through the rare-earth doped optical fiber 71 without splitting the input signal, thereby only generating a small loss. The optical amplifying unit 70 has a simple configuration and can be easily controlled.

Figure 15:
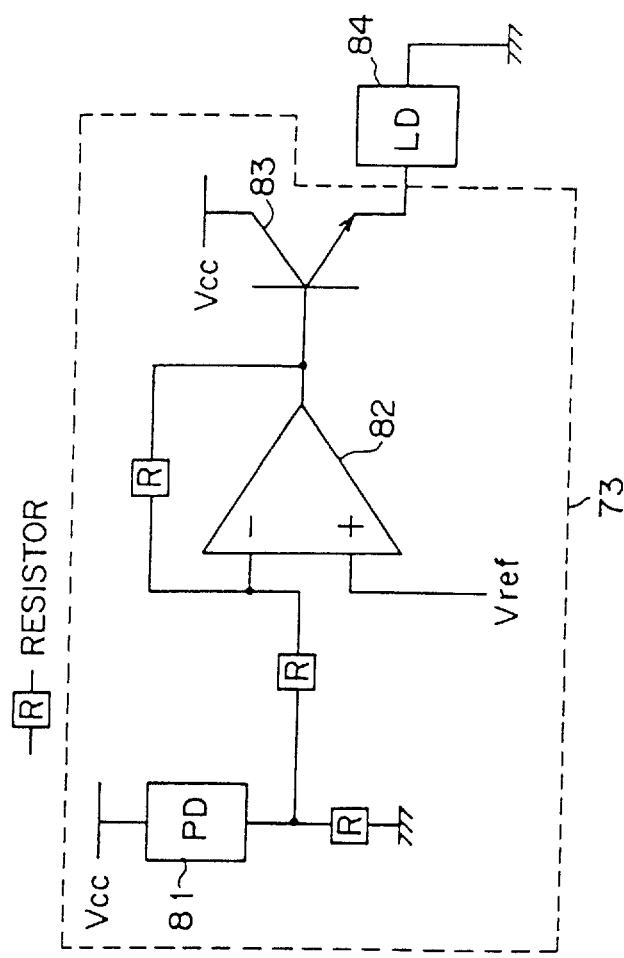
FIG. 15 shows an example of the configuration of the APC (automatic power control) circuit.

FIG. 15 shows an example of the configuration of the APC circuit. The APC circuit has basically the same configuration as the ALC circuit shown in FIG. 9.

A photodiode 81 detects an output level from the light source 72. Assuming that the light source 72 is a semiconductor laser, the photodiode 81 indirectly detects the output level of the light source 72 by detecting the back light power of the laser light source. The functions of an operational amplifier 82 and a power transistor 83 are the same as those of the operational amplifier 32 and power transistor 33 provided in the ALC circuit shown in FIG. 9. A semiconductor laser 84 corresponds to the light source 72 shown in FIG. 14.

The feedback system including the operational amplifier 82 performs control in such a way that the voltage applied to the inverting input terminal matches the reference voltage. That is, the APC circuit controls the output level of the semiconductor laser 84 (light source 72).

Figure 16:
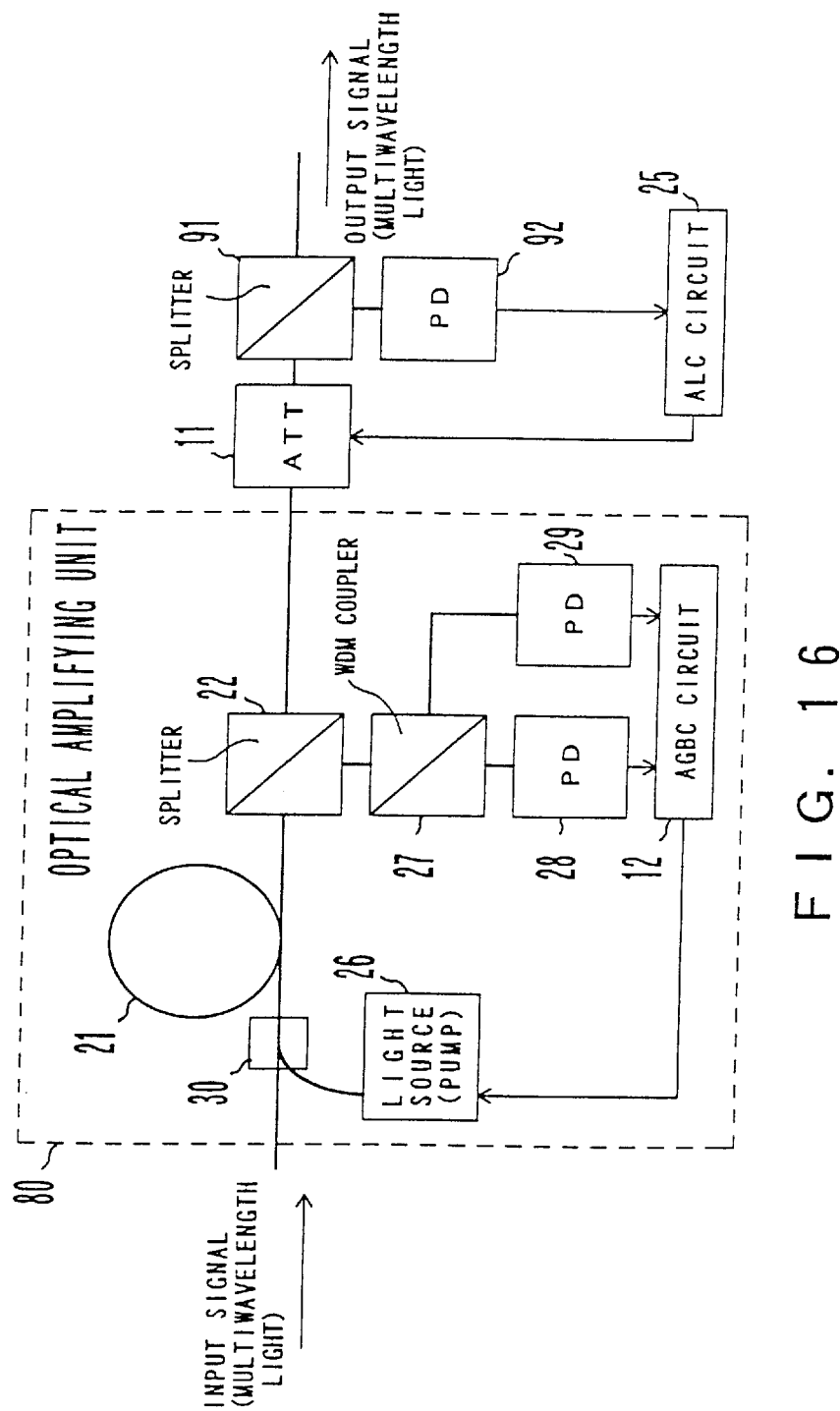
FIG. 16 shows the configuration of the optical equalizing amplifier according to the fourth embodiment of the present invention.

FIG. 16 shows the configuration of the optical equalizing amplifier according to the fourth embodiment of the present invention. In the optical equalizing amplifier according to the fourth embodiment, the variable optical attenuator 11 is provided after an optical amplifying unit 80. In the fourth embodiment, an optical signal is equalized by controlling an optical gain balance through the control of the light intensity of the excitation light for exciting the rare-earth doped optical fiber 21 in the optical amplifying unit 80. The level of an output signal is kept constant by controlling the attenuation of the variable optical attenuator 11.

The optical signal (multiwavelength light) input to the optical amplifying unit 80 is amplified by the rare-earth doped optical fiber 21. Most of the optical signal output from the rare-earth doped optical fiber 21 is transmitted to the variable optical attenuator 11, and a portion of the output signal is split by the optical splitter 22 for the control of the automatic gain balance. That is, the wavelength division multiplexing coupler 27 produces an optical signal in which whose shorter wavelength components are transmitted and an optical signal in which longer wavelength components are transmitted, and provides them to the photodiodes 28 and 29. The photodiodes 28 and 29 convert the received optical signals into electrical signals and input them to the AGBC circuit 12.

The AGBC circuit 12 of this fourth embodiment is shown in FIG. 10. When the AGBC circuit 12 is applied to the fourth embodiment, the power transistor 45 drives a semiconductor laser 47 in FIG. 10. The semiconductor laser 47 corresponds to the light source 26 shown in FIG. 16.

The AGBC circuit 12 controls the light source 26 in such a way that the optical signal levels detected by the photodiodes 28 and 29 is matched. That is, the AGBC circuit 12 controls the light intensity of the excitation light generated by the light source 26 in such a way that the optical levels of optical signals split from the optical signals output from the rare-earth doped optical fiber 21 and having different wavelength bands, match each other. Thus, the optical output of the rare-earth doped optical fiber 21 is equalized in terms of wavelength.

For example, when the output signal from the rare-earth doped optical fiber 21 indicates higher levels for shorter wavelength components and lower levels for longer wavelength components as shown in FIGS. 11B(1), 11B(2) and 11B(3), the optical signal received by the photodiodes 28 (41) and 29 (42) show the states as shown in FIGS. 11B(2) and 11B(3), respectively. In this case, since the output value from the photodiode 28 (41) is larger than the output value of the photodiode 29 (42) as described above, the voltage applied to the inverting input terminal of the operational amplifier 44 becomes higher than the reference voltage.

The feedback control system including the operational amplifier 44 reduces the drive current of the semiconductor laser 47 (light source 26) to make the voltage applied to the inverting input terminal match the reference voltage. When the drive current of the semiconductor laser 47 (light source 26) is reduced, the intensity of the excitation light provided to the rare-earth doped optical fiber 21 is reduced, thereby lowering the excitation ratio. If the excitation ratio of the rare-earth doped optical fiber 21 is lowered, then the optical gain for longer wavelength lights becomes relatively larger than that for shorter wavelength lights as explained above by referring to FIG. 3.

That is, when the rare-earth doped optical fiber 21 outputs an optical signal indicating a high level for shorter wavelength components and a low level for longer wavelength components, the gain slope of the rare-earth doped optical fiber 21 can be amended in the positive direction by reducing the intensity of the excitation light of the semiconductor laser 47 (light source 26) to make the level for longer wavelength components relatively higher than the level for shorter wavelength components. Through the amendment of the gain, the output signal from the rare-earth doped optical fiber 21 is equalized. When the state shown in FIGS. 11A(1), 11A(2) and 11A(3) appears, the voltage applied to the inverting input terminal of the operational amplifier 44 matches the reference voltage. Therefore, the drive current of the semiconductor laser 47 (light source 26) is kept in this state.

If the rare-earth doped optical fiber 21 outputs a multi-wavelength light indicating a low level for shorter wavelength components and a high level for longer wavelength components, the gain slope of the rare-earth doped optical fiber 21 can be amended in the negative direction by increasing the intensity of the excitation light from the semiconductor laser 47 (light source 26) to equalize the multiwavelength light.

Thus, the optical equalizing amplifier according to the fourth embodiment shown in FIG. 16 automatically controls the optical gain balance by controlling the intensity of the excitation light provided for the rare-earth doped optical fiber of the optical amplifying unit, and equalizes the optical signal (multiwavelength light).

According to the fourth embodiment shown in FIG. 16, an output level is kept constant using the variable optical attenuator 11 provided after the optical amplifying unit 80. That is, a portion of optical signal output from the variable optical attenuator 11 are split through a splitter 91, and the level of the optical signal is detected by a photodiode 92. The ALC circuit 25 is provided with the level of the optical signal detected by the photodiode 92. The ALC circuit 25 controls the attenuation of the variable optical attenuator 11 (in this case, the variable optical attenuator corresponds to ATT shown in FIG. 9) such that the optical signal level can be set to a constant value determined by the reference voltage.

Compared with the configuration according to the first embodiment of the present invention, the configuration according to the fourth embodiment is advantageous in reducing noise because an amplifying unit is provided before the attenuator. However, according to the configuration of the fourth embodiment, an optical signal is attenuated by an attenuator after equalizing the optical signal. Therefore, it is inferior in equalization precision to the first configuration.

Figure 17:
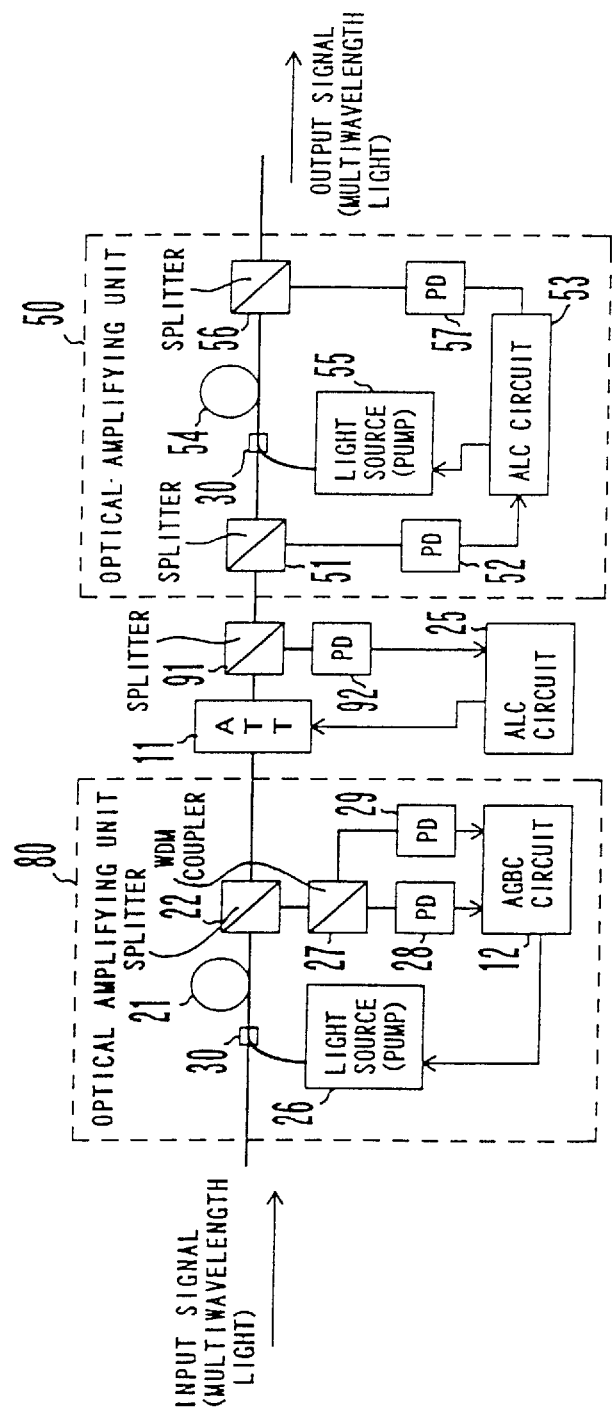
FIG. 17 shows the configuration of the optical equalizing amplifier according to the fifth embodiment of the present invention.

FIG. 17 shows the configuration of the optical equalizing amplifier according to the fifth embodiment. The optical equalizing amplifier according to the fifth embodiment comprises the optical amplifying unit 50 shown in FIG. 12 provided after the optical equalizing amplifier of the fourth embodiment.

Figure 18:
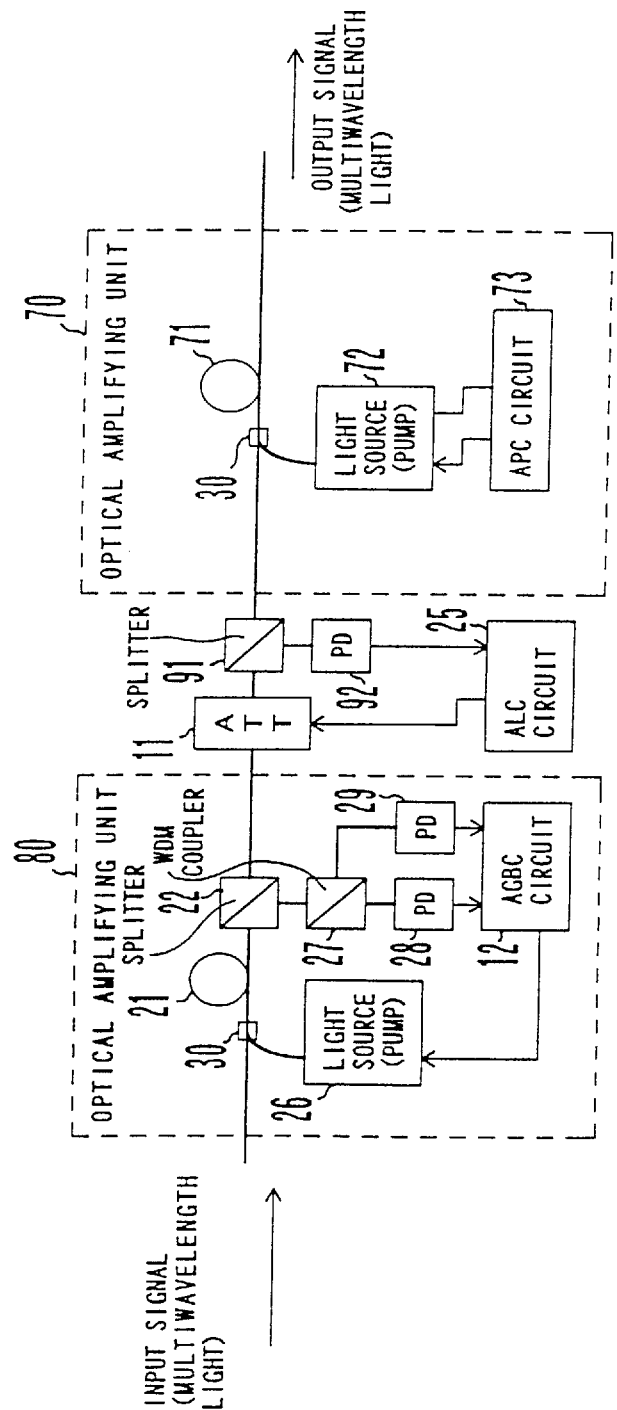
FIG. 18 shows the configuration of the optical equalizing amplifier according to the sixth embodiment of the present invention.

FIG. 18 shows the configuration of the optical equalizing amplifier according to the sixth embodiment. The optical equalizing amplifier according to the sixth embodiment comprises the optical amplifying unit 70 shown in FIG. 14 provided after the optical equalizing amplifier of the fourth embodiment. Since the optical equalizing amplifier according to the sixth embodiment performs ALC control using the variable optical attenuator 11, the output level of the variable optical attenuator 11 can be kept constant. Therefore, only the APC control needs to be performed at an operation step after the variable optical attenuator 11, thereby simplifying the configuration and control.

FIG. 19 shows the configuration of the optical equalizing amplifier according to the seventh embodiment. The optical equalizing amplifier according to the seventh embodiment comprises the optical amplifying unit 100 provided after the optical equalizing amplifier of the fourth embodiment.

An optical amplifying unit 100 executes control for constant optical output by controlling the light intensity of an excitation light provided to a rare-earth doped optical fiber 101. That is, the ALC circuit 25 in the optical amplifying unit 100 performs feedback control of the light intensity of a light source 102 such that the output level of the rare-earth doped optical fiber 101 can be kept constant.

The optical equalizing amplifier according to the seventh embodiment first keeps the output optical level constant through the variable optical attenuator 11, and then executes again the control for constant optical output through the optical amplifying unit 100. The optical equalizing amplifier according to the seventh embodiment is designed mainly to control an output level.

Figure 20:
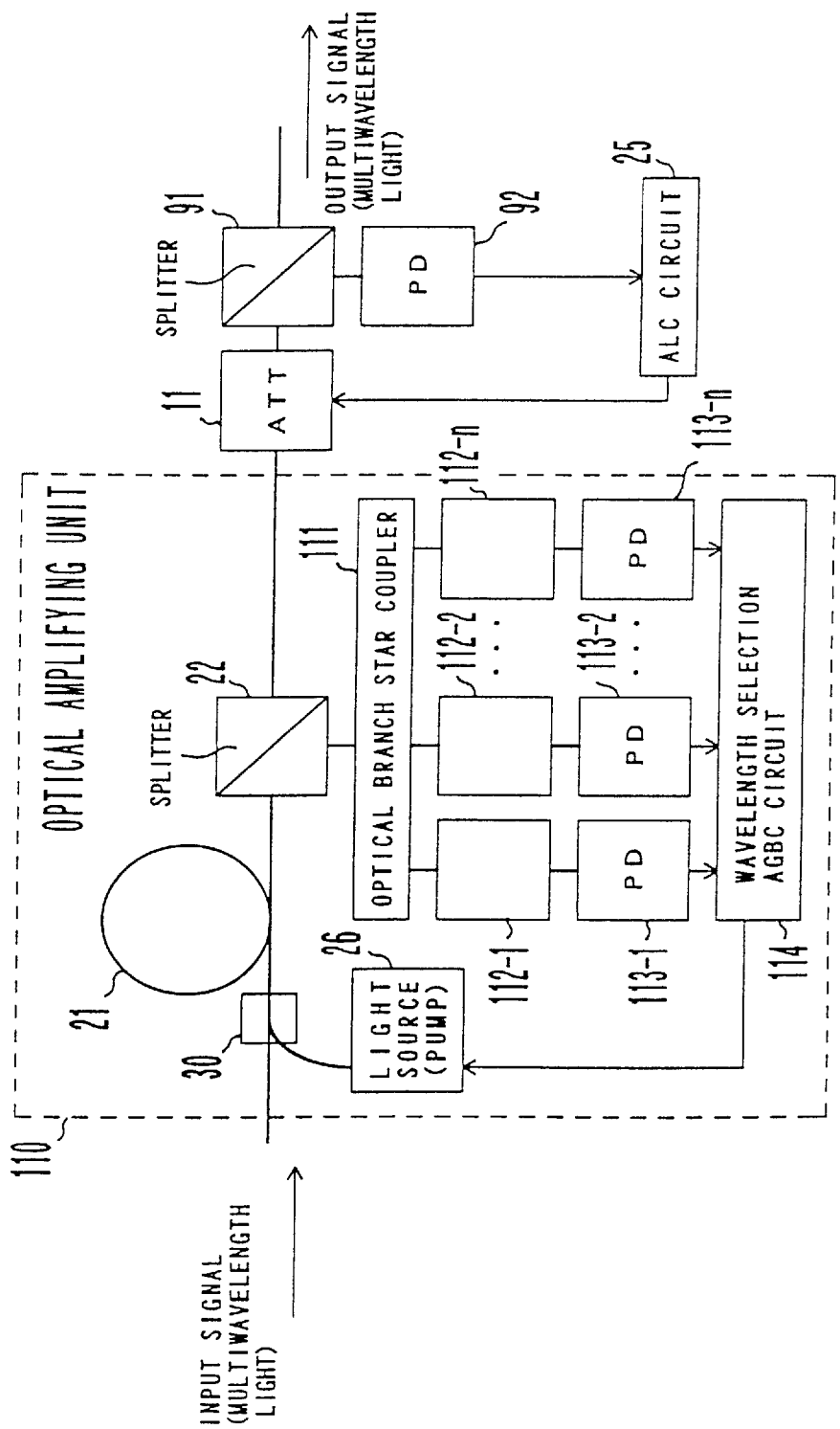
FIG. 20 shows the configuration of the optical equalizing amplifier according to the eighth embodiment of the present invention.

FIG. 20 shows the configuration of the optical equalizing amplifier according to the eighth embodiment. The optical equalizing amplifier according to the eighth embodiment is based on the optical equalizing amplifier of the fourth embodiment and improves gain balance control.

An optical amplifying unit 110 performs gain balance control in such a way that it detects wavelength bands having an optical level higher than a predetermined value among a plurality of wavelength bands contained in multi-wavelength light, and that the optical levels for the longest and shortest wavelengths among the detected bands can be balanced, that is, the optical level for the longest wavelength can be equal to that for the shortest wavelength.

The optical splitter 22 provides a portion of the optical signals amplified by the rare-earth doped optical fiber 21 to an optical branch star coupler 111. The optical branch star coupler 111 equally divides a received optical signal into n signals in the signal wavelength band (in this case, a 1.55 $\mu$m band). The n equal optical signals are respectively provided to wavelength selection filters 112-1–112-n.

The wavelength to which a signal is applied in an optical signal (multiwavelength light) is predetermined when the system is designed. In the example shown in FIG. 1 or 3, each of the wavelengths of ch 1–ch 4 is predetermined. The wavelength selection filters 112-1–112-n transmit the wavelength of each channel. In this example, the wavelength selection filters 112-1–112-n transmit wavelengths in the range of the center wavelength plus or minus 1 nm for each channel. Therefore, each of the outputs from the wavelength selection filters 112-1–112-n transmits an optical signal having a wavelength corresponding to each channel. In this example, the smaller the number of the wavelength selection filters 112-1–112-n (1–n), the shorter the wavelength they transmit. That is, the transmitted wavelength of the wavelength selection filter 112-1 is the shortest and the transmitted wavelength of the wavelength selection filters 112-n is the longest.

Each of the wavelength selection filters may not only be provided for each channel, but may be provided for a plurality of channels.

Figure 21:
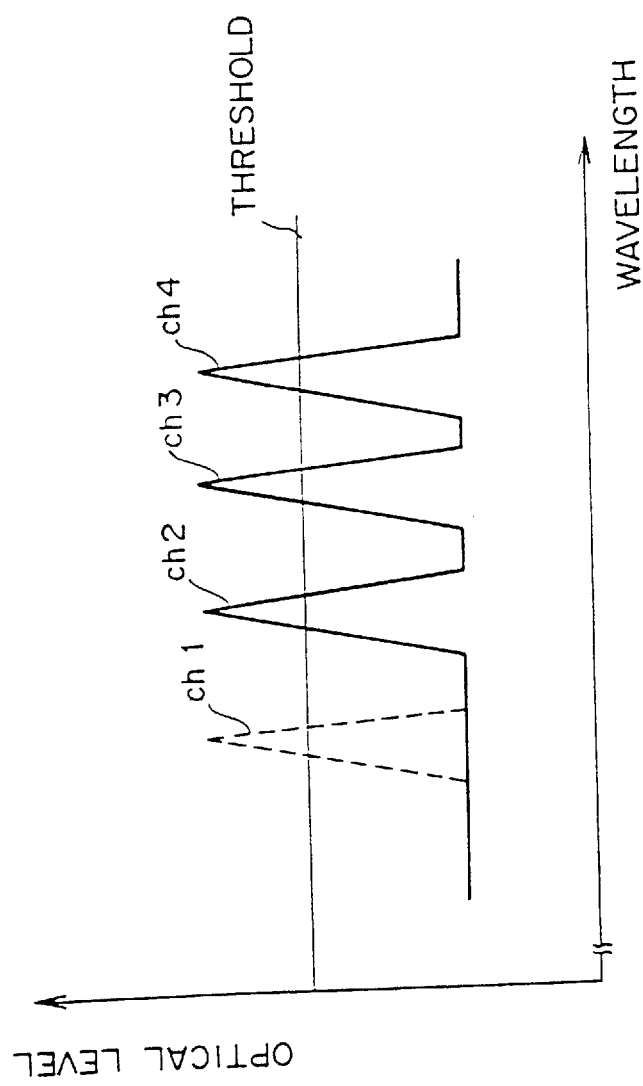
FIG. 21 shows the operation of selecting a specific wavelength based on an optical level.

The optical signals transmitted through the wavelength selection filters 112-1–112-n are respectively provided to photodiodes 113-1–113-n. Therefore, the smaller the number of the photodiodes 113-1–113-n (1–n) receives a shorter wavelength. The photodiodes 113-1–113-n detect the optical level of each wavelength band (each channel). A wavelength selection AGBC circuit 114 detects, based on the optical level of each channel detected by the photodiodes 113-1–113-n, a channel which actually transmits signals from a plurality of channels contained in the multiwavelength light. The channel actually transmitting such signal indicates a higher optical level when compared with a channel not transmitting such signals. Therefore, the channel actually transmitting signals can be detected by setting an appropriate threshold and detecting a channel whose optical level is higher than the threshold. The example in FIG. 21 shows the state in which signals are transmitted through ch 2, through ch 4 but no signals are transmitted through ch 1.

The wavelength selection AGBC circuit 114 selects a channel having the largest wavelength and a channel having the shortest wavelength from among the channels whose optical levels are higher than the threshold. In the example shown in FIG. 21, ch 2 and ch 4 are selected. The wavelength selection AGBC circuit 114 controls the light source 26 such that the optical levels of the two selected channels match each other.

Figure 22:
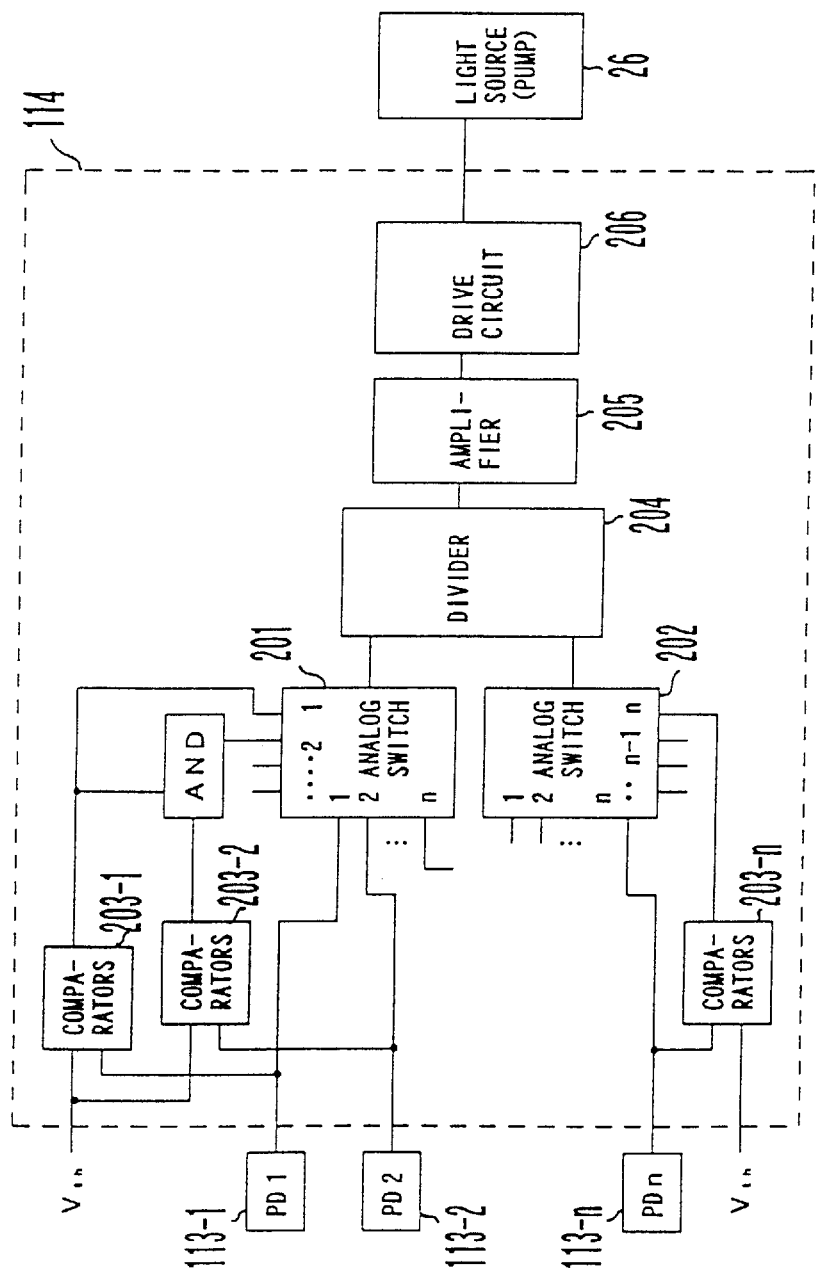
FIG. 22 shows the configuration of the wavelength selecting AGBC circuit.

The wavelength selection AGBC circuit 114 has the above described wavelength selecting function added to the AGBC circuit shown in FIG. 10. FIG. 22 shows the configuration of the important portion of the wavelength selection AGBC circuit 114.

The outputs from the photodiodes 113-1–113-n are respectively input to analog switches 201 and 202 as the detected optical signal level for each channel. The outputs from the photodiodes 113-1–113-n are also input to comparators 203-1–203-n respectively. Each of the comparators 203-1–203-n compares the detected optical signal level of each channel with the threshold Vth and outputs the comparison result at the TTL level. The comparators 203-1–203-n output an "L" level when the received level of the detected optical signal level is larger than the threshold Vth.

The output of the comparator 203-1 is input to the first selection terminal of the analog switch 201. When the output from the comparator 203-1 is the L level, the L-level signal is input to the first selection terminal of the analog switch 201, and the analog switch 201 outputs the voltage applied to the first terminal. That is, when a signal is transmitted along channel 1, the analog switch 201 outputs the detected optical signal level of channel 1. When the output from the comparator 203-1 is the H level, that is, when channel 1 is not transmitting a signal, the analog switch 201 does not output the voltage applied to the first terminal.

A logical product of the output from the comparator 203-1 and the output from the comparator 203-2 is input to the second selection terminal of the analog switch 201. Therefore, when the output from the comparator 203-2 is the "L" level, the "L" level is input to the second selection terminal of the analog switch 201. In this case, the analog switch 201 outputs the voltage applied to the second terminal. That is, if channel 1 transmits no signal and channel 2 is transmitting a signal, then the analog switch 201 outputs the detected optical level of channel 2.

Thus, the analog switch 201 outputs the optical level signal of the channel having the shortest wavelength of the channels transmitting signals. Similarly, the analog switch 202 outputs the optical level signal of the channel having the longest wavelength of the channels transmitting signals.

An divider 204, an amplifier 205, and an drive circuit 206 have the functions of the divider 43, operational amplifier 44, and power transistor 45 in FIG. 10 respectively. Therefore, the wavelength selection AGBC circuit 114 controls the light intensity of the light source 26 in such a way that the output from the analog switch 201 matches the output from the analog switch 202. That is, the wavelength selection AGBC circuit 114 controls the intensity of the excitation light provided to the rare-earth doped optical fiber 21 in such a way that the optical level of the channel having the shortest wavelength of the channels transmitting signals matches the optical level of the channel having the longest wavelength of the channels transmitting signals.

In consideration of the amplification characteristics of the rare-earth doped optical fiber, band characteristics of the transmission line, etc., it is expected that the optical levels of all channels are identical if the optical levels of two channels match each other. However, if the optical level of the channel having the shortest wavelength is made to match the optical level of the channel having the longest wavelength as in the eighth embodiment shown in FIG. 20, the resultant error is the smallest. Therefore, the error of the optical equalization can be very small according to the eighth embodiment.

The optical equalizing amplifier according to the eighth embodiment performs a gain balance control in which the optical level of the shortest wavelength signals actually being transmitted is made to match the optical level of the longest wavelength. Therefore, when the signal transmission along a specific channel is stopped or when a channel is added, an appropriate control can be executed with high precision in optical equalization. For example, while signals are transmitted in all of ch 1,2, . . . , n the equalization control is performed using optical level data of ch 1 and ch n. Then if signal transmission on ch 1 is stopped, the equalization control is performed using the optical level data of ch 2 and ch n. This switching of control is done automatically and quickly.

In FIG. 20, the optical intensity of the excitation light is controlled, but the gain balance control can also be executed by controlling the variable optical attenuator using the wavelength selection AGBC circuit. This method is based on the optical equalizing amplifier shown in FIG. 5.

FIG. 23 shows the configuration of optical equalizing amplifier according to the ninth embodiment. The optical equalizing amplifier according to the ninth embodiment is based on the optical equalizing amplifier according to the eighth embodiment, and is designed with improved gain balance control.

An optical amplifying unit 120 has a plurality of rare-earth doped optical fibers having different amplification characteristics for respective wavelengths and individually controls the excitation light input to each rare-earth doped optical fiber to perform a higher-precision gain balance control.

Rare-earth doped optical fibers 121, 122, and 123 are Al-P-EDF-, Al-Si-EDF-, and Al-Ge—Si-EFF-type fibers respectively, and are different in wavelength gain characteristics. The Al-P-type erbium doped optical fiber has a wavelength characteristics of a smaller gain for a longer wavelength. The wavelength characteristics of the Al—Si-type erbium doped optical fiber is shown in FIG. 3. The Al—Ge—Si-type erbium doped optical fiber has the wavelength characteristics that the largest gain is obtained around the center of the amplification wavelength band.

The rare-earth doped optical fibers 121, 122, and 123 are connected in series. Light sources 124, 125, and 126 provide excitation light to the rare-earth doped optical fibers 121, 122, and 123 respectively, under the control of a CPU controlled circuit 127.

The CPU controlled circuit 127, which includes CPU, controls the light intensity of the excitation light generated by the light sources 124, 125, and 126 based on the optical level of each channel detected by the photodiodes 113-1–113-n.

Figure 24:
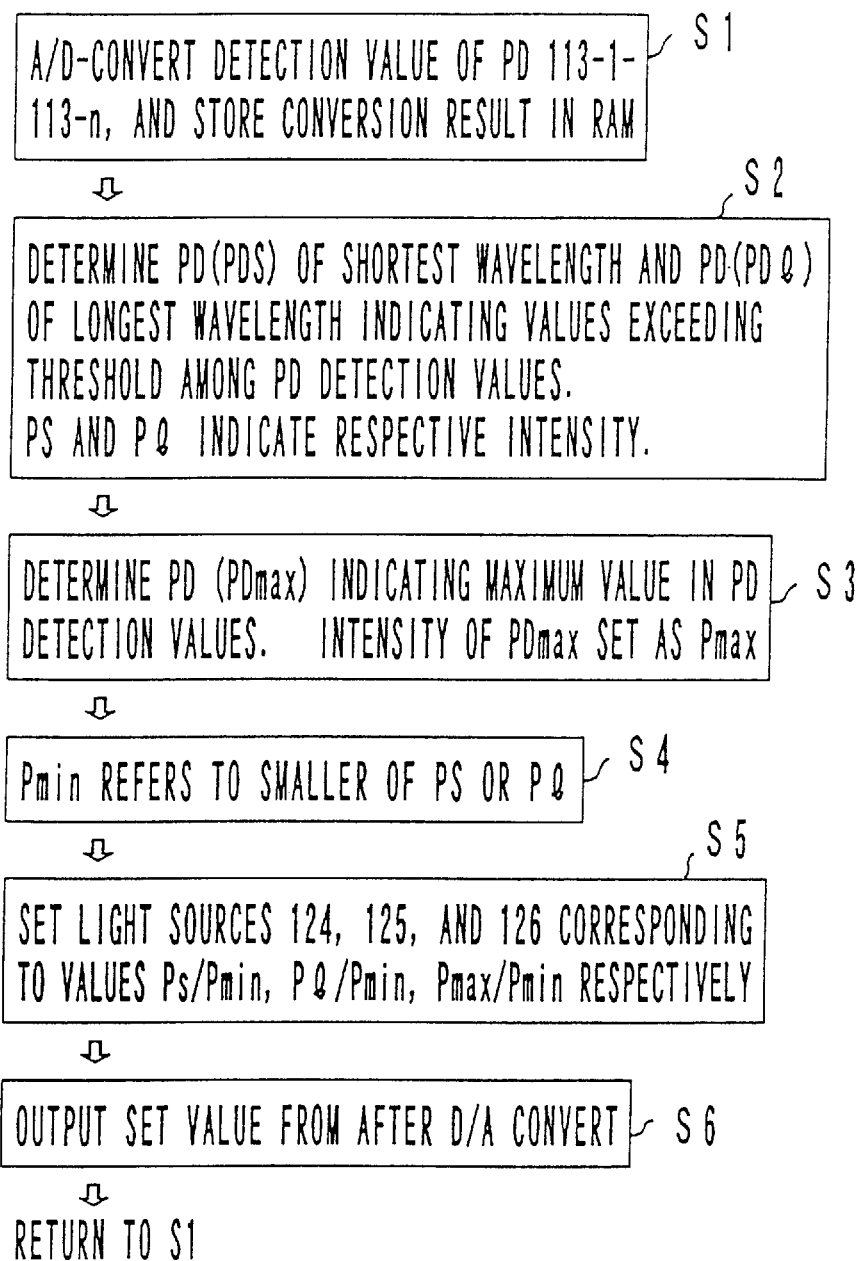
FIG. 24 is a flowchart showing the operation of the CPU controlled circuit.
Figure 25:
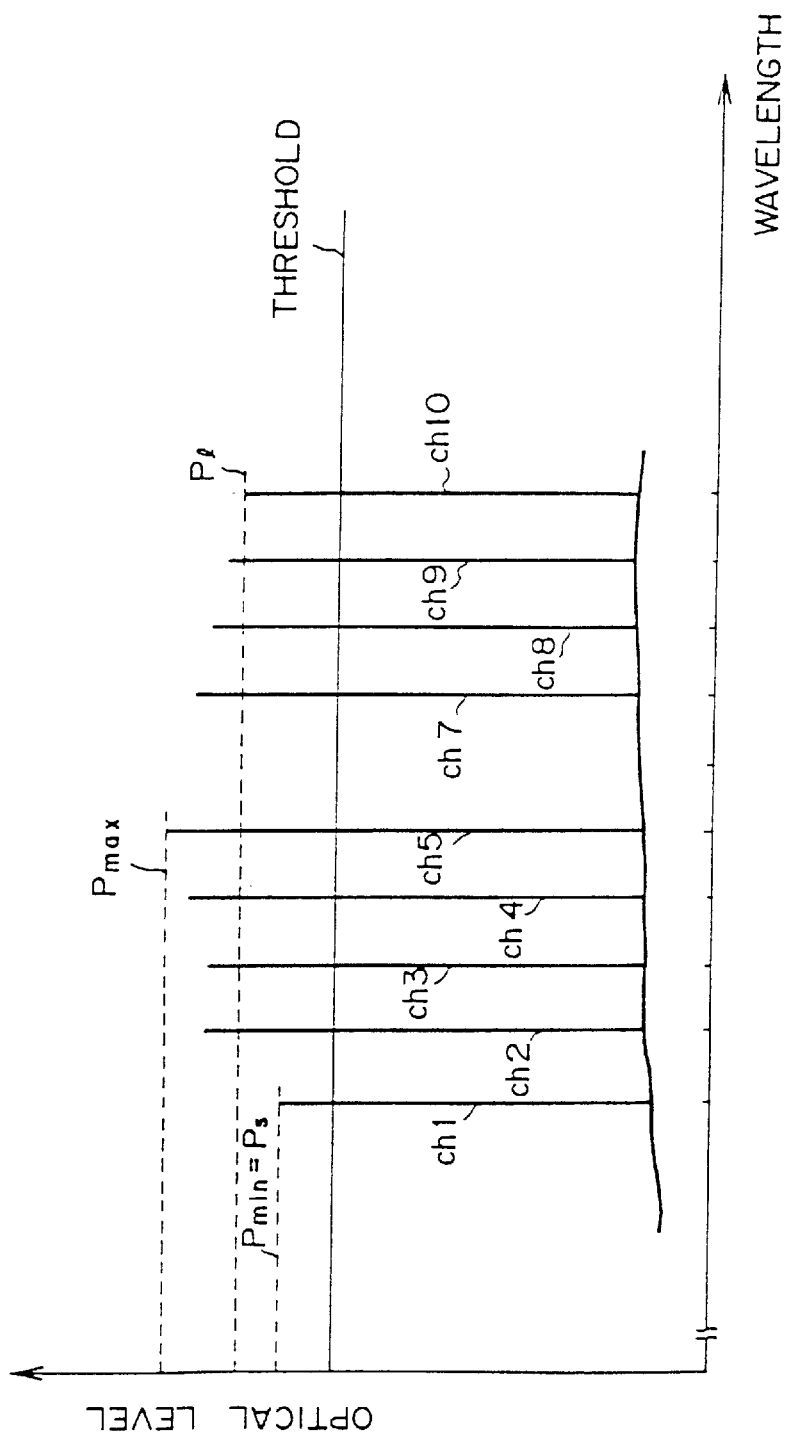
FIG. 25 shows an example of output optical levels.

FIG. 24 is a flowchart showing the operation of the CPU controlled circuit 127. In this example, ch 1 through ch 10 are wavelength-multiplexed. FIG. 25 shows an example of the output signal of the optical amplifying unit 120. The flowchart in FIG. 24 is explained by referring to the example shown in FIG. 25.

In step S1, the optical level of each of the channels detected by the photodiodes 113-1–113-10 is received, and each value is A/D converted and written to a memory (RAM) not shown.

In step S2, the photodiodes corresponding to the channel (ch 1) having the shortest wavelength and the channel (ch 10) having the longest wavelength respectively of the photodiodes whose detected optical levels exceed the threshold, (the photodiodes corresponding to ch 1 through ch 5 and ch 7 through ch 10), are determined. It is assumed that the optical intensity of the channel (ch 1) having the shortest wavelength is Ps, and that of the channel (ch 10) having the longest wavelength is Pl.

In step S3, the photodiode (corresponding to ch 5) indicating the highest optical level detected is determined, and the light intensity is determined to be Pmax.

In step S4, Ps and Pl are collated and the smaller is set as Pmin. Since the optical level of ch 1 is lower than the optical level of ch 10, Ps equals Pmin.

In step S5, Ps/Pmin, Pl/Pmin, and Pmax/Pmin are calculated, and the information for use in controlling the light sources 124, 125, and 126 is retrieved from a control information storage table shown in FIG. 26 according to the calculated values.

The control information storage table stores the information specifying the optical intensity of the excitation light generated by each of the light sources 124, 125, and 126 for Ps/Pmin value, Pl/Pmin value, and Pmax/Pmin value. The information is preliminarily computed through simulation, etc.

If the optical level of ch 1 is lower than the optical level of ch 10 as shown in the example in FIG. 25, for example, the dependency on the rare-earth doped optical fiber 121 is increased to approach 0 in the overall gain slope. In this case, the CPU controlled circuit 127 increases the intensity of the excitation light of the light source 124. Since the optical level of ch 5 is Pmax, the CPU controlled circuit 127 determines that the gain around the center of the amplification wavelength band is too large. In this case, the CPU controlled circuit 127 decreases the intensity of the excitation light of the light source 126 to decrease the dependency on the rare-earth doped optical fiber 123.

In step S6, the three values retrieved from the control information storage table are D/A converted and output to the light sources 124, 125, and 126.

The optical amplifying unit 120 controls the light intensity of the excitation light output by the light sources 124, 125, and 126 through the operations of the above described CPU controlled circuit 127 to equalize the optical levels of each channel of the output multiwavelength light. The multiwavelength light output from the optical amplifying unit 120 keeps a constant optical level by controlling the attenuation of the variable optical attenuator 11.

The method of controlling the excitation light provided to the rare-earth doped optical fibers 121, 122, and 123 is shown in FIG. 23. It can also be designed such that the optical signals are equalized by providing variable optical attenuators at the input side of each of the rare-earth doped optical fibers 121, 122, and 123 and by the CPU controlled circuit 127 controlling the attenuation of each variable optical attenuator.

In the above described embodiment, optical signals having different wavelength components are produced using a wavelength division multiplexing coupler. An optical filter which transmits only a specific wavelength can also be used instead of a wavelength division multiplexing coupler.

Also in the above described embodiment, the output level of each channel is equalized. However, it is obvious that a predetermined characteristic can be assigned to the output level of each channel. For example, the output level with a longer wavelength can be increased using an optical fiber amplifier of the above embodiment. Such alteration in design can be made by setting an appropriate reference voltage or by changing a feedback system of an operational amplifier in the AGBC circuit shown in FIG. 10.

In the above described embodiment, a variable optical attenuator is provided before or after the optical fiber amplifier. However, the optical equalizing amplifier according to the present invention is not limited to this configuration, and a unit for adjusting an optical level only is required instead of the variable optical attenuator as shown in FIG. 27.

Figure 27A:
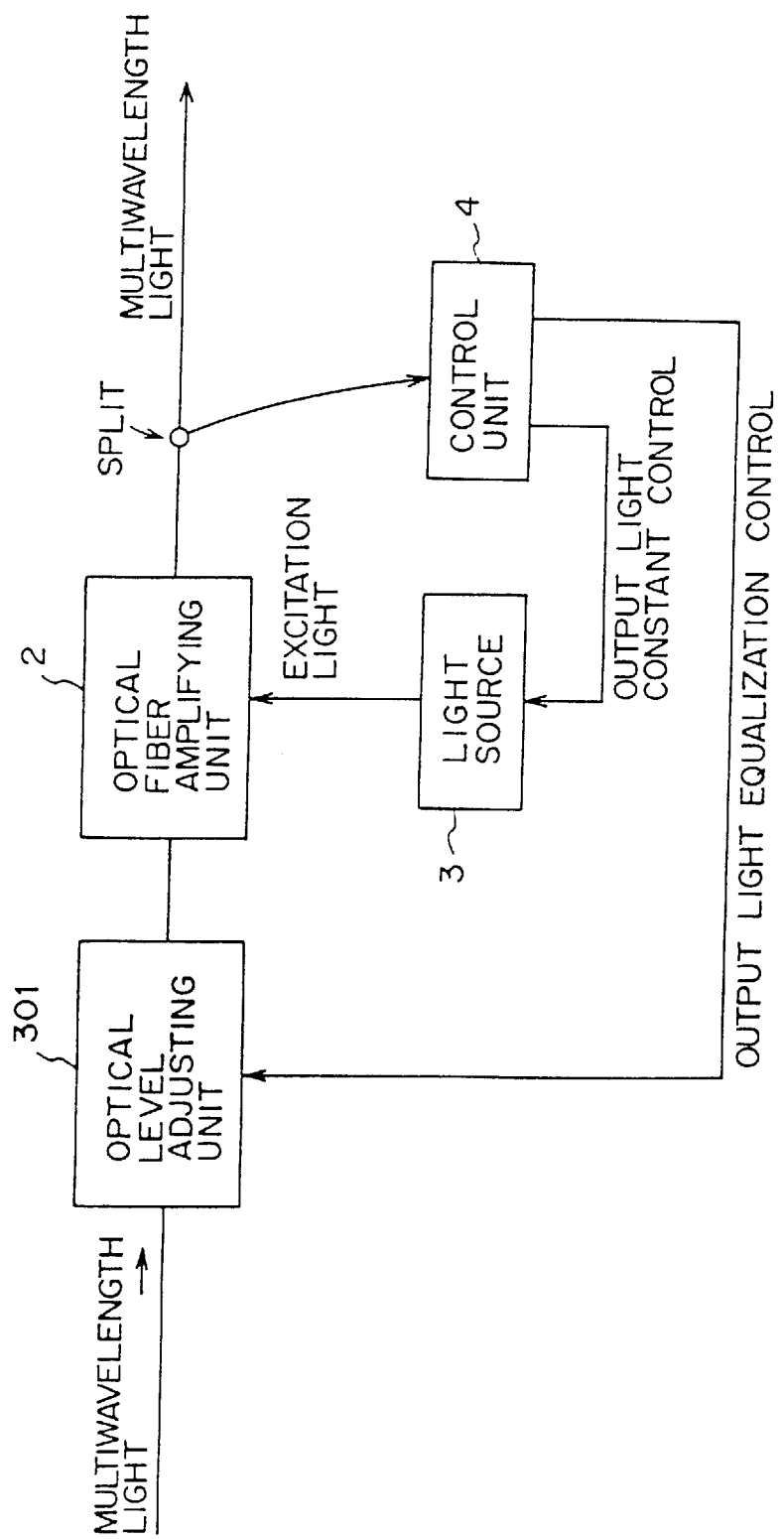
FIG. 27A shows the configuration of a variation of the optical equalizing amplifier shown in FIG. 2A.
Figure 27B:
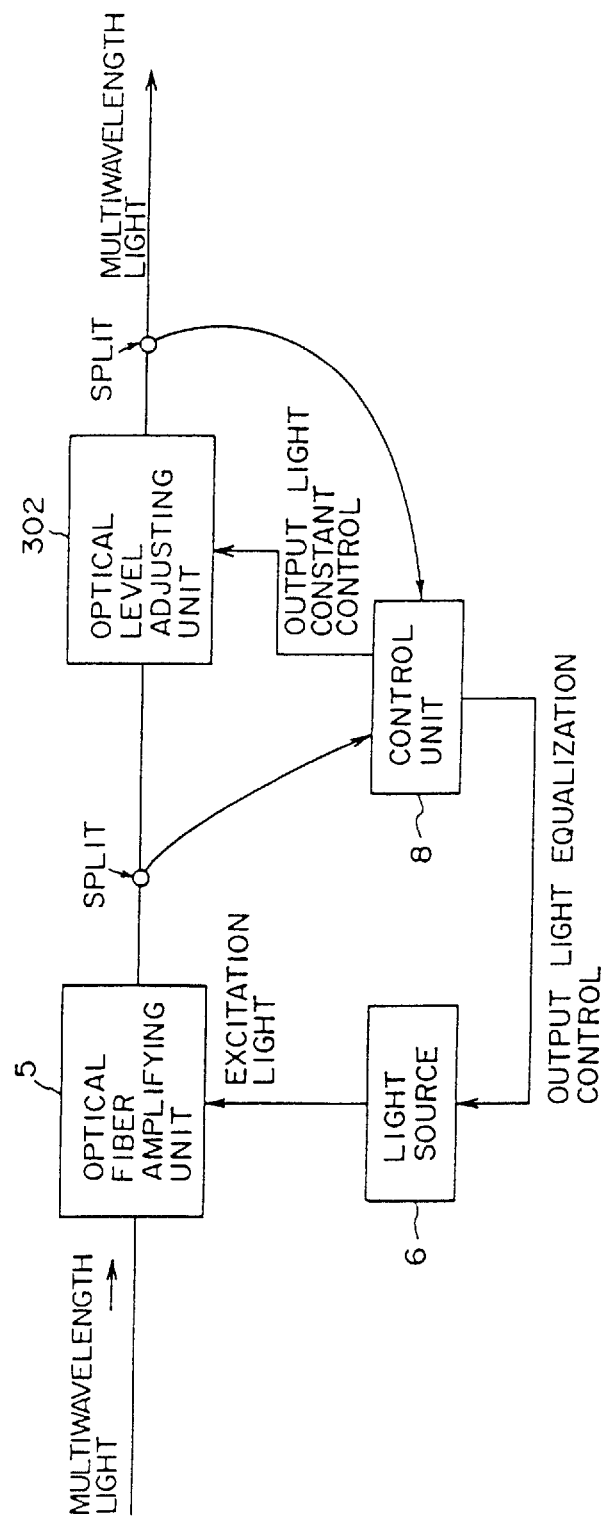
FIG. 27B shows the configuration of a variation of the optical equalizing amplifier shown in FIG. 2B.

FIG. 27A shows the configuration in which the variable optical attenuating unit 1 shown in FIG. 2A is replaced with an optical level adjusting unit 301. FIG. 27B shows the configuration in which the variable optical attenuating unit 7 shown in FIG. 2B is replaced with an optical level adjusting unit 302.

Figure 28:
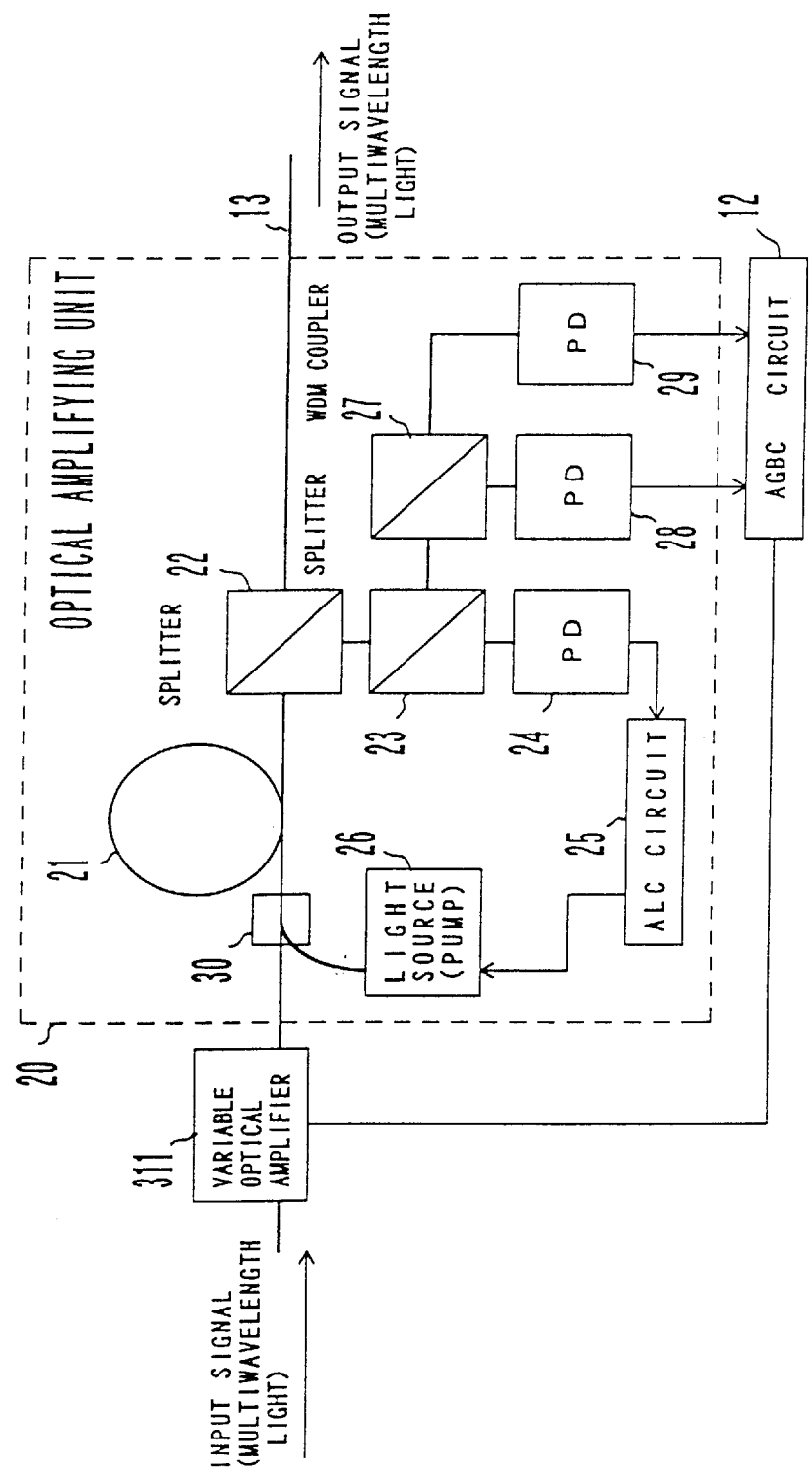
FIG. 28 show the configuration of a variation of the optical equalizing amplifier according to the first embodiment of the present invention.
Figure 29:
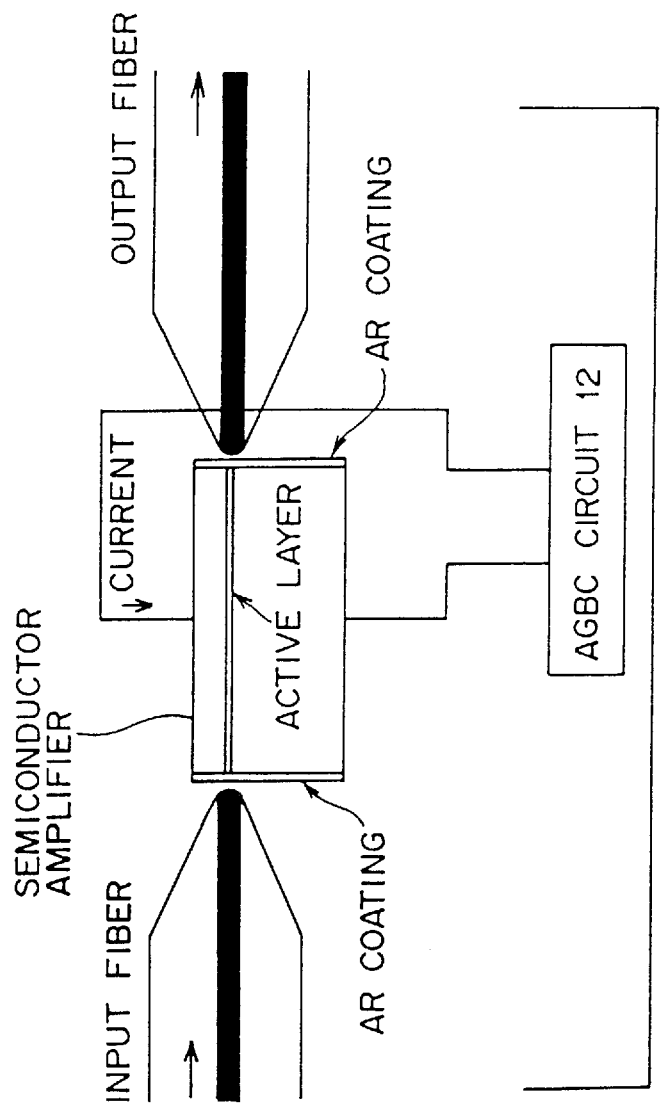
FIG. 29 shows an example in which a semiconductor amplifier is applied as an optical level adjusting unit.

FIG. 28 shows an embodiment of the configuration shown in FIG. 27A, and a variable optical amplifier is used as an optical level adjusting unit. The optical equalizing amplifier shown in FIG. 28 is obtained by replacing the variable optical attenuator 11 according to the first embodiment shown in FIG. 5 with a variable optical amplifier 311. The variable optical amplifier 311 is, for example, a semiconductor amplifier as shown in FIG. 29.

The optical gain of a semiconductor amplifier alters with an applied current. The current applied to the semiconductor amplifier is controlled by the AGBC circuit 12. The AGBC circuit 12 is designed as shown in FIG. 10, and controls the current to be provided to the semiconductor amplifier to equalize the output signal from the rare-earth doped optical fiber 21. The optical signal input to the semiconductor amplifier is amplified by a gain depending on an applied current when the optical signal passes through an active layer.

For example, in FIG. 28, when the optical level of a longer wavelength component is higher than the optical level of a shorter wavelength component of an output signal from the rare-earth doped optical fiber 21, the AGBC circuit 12 reduces the amplification ratio by decreasing the current applied to the semiconductor amplifier to amend the gain of the rare-earth doped optical fiber 21. If the amplification ratio of the semiconductor amplifier is reduced, then the input level of an optical signal to the rare-earth doped optical fiber 21 becomes lower and the excitation ratio of it becomes higher. Therefore, the gain can be amended as indicated by the characteristics shown in FIG. 3.

Thus, the optical equalizing amplifier according to the present invention can be designed to attenuate or amplify an optical signal when the level of an optical signal input to the optical fiber amplifier is adjusted to control a gain balance.

Figure 30:
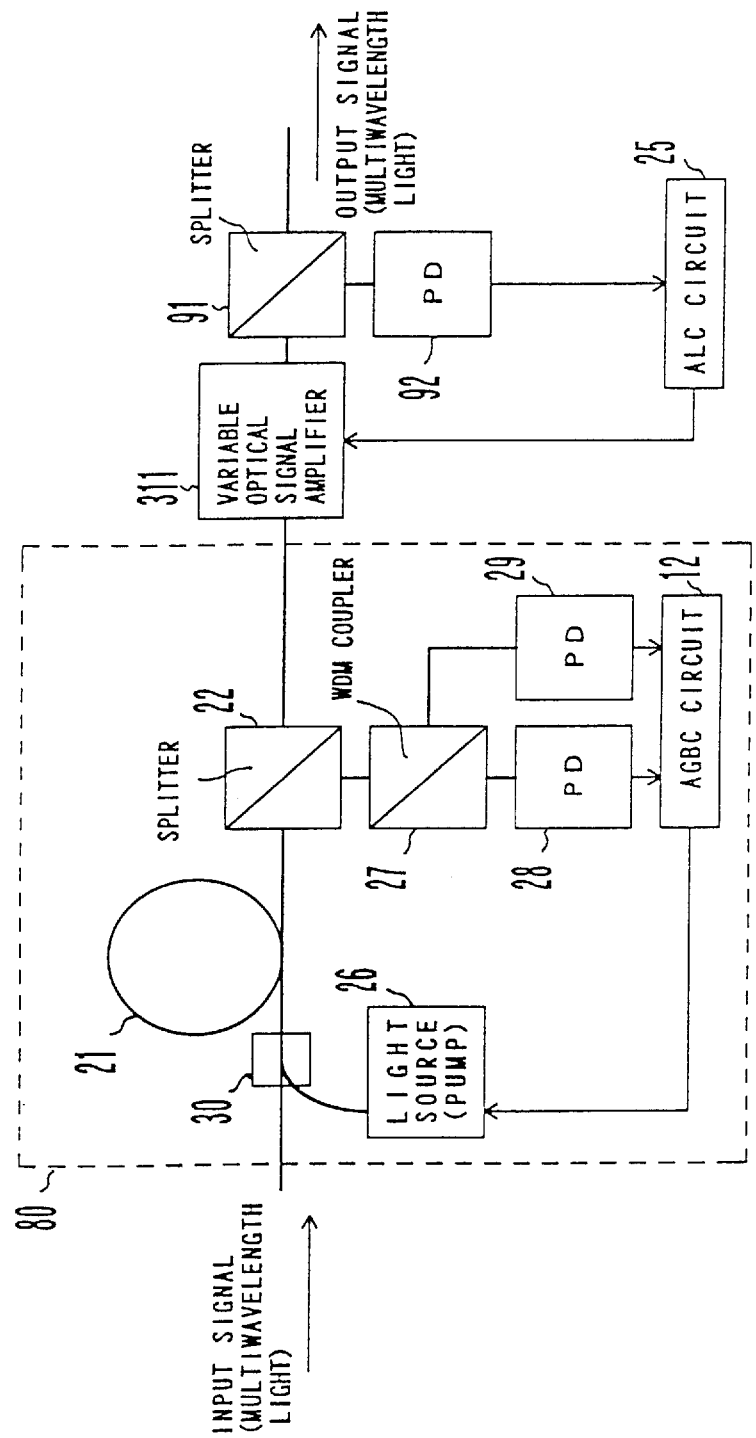
FIG. 30 shows the configuration of a variation of the optical equalizing amplifier according to the fourth embodiment of the present invention.

FIG. 30 shows the embodiment of the configuration shown in FIG. 27B. The optical equalizing amplifier shown in FIG. 30 comprises the variable optical amplifier 311 instead of the variable optical attenuator 11 of the fourth embodiment shown in FIG. 16. However, the variable optical amplifier 311 requires characteristics that the optical gain completely or mostly independent of the wavelength.

As described above, the optical equalizing amplifier can equalize optical output levels of signals of various wavelengths while maintaining a constant value for an average output level when a multiwavelength light is amplified.

Since the function of maintaining a constant value of an average output level is separate from the function of equalizing the optical output levels of signals of various wavelengths, each function can be easily controlled.

One of the above described functions is performed by a method of controlling the attenuation of a variable optical attenuator, and the optical attenuation level of the variable optical attenuator is completely or mostly independent of wavelength. Therefore, control can be easily executed.

What is claimed is:

1. An optical equalizing amplifier for equalizing a multiwavelength light, comprising:

a variable optical attenuator for adjusting an optical level of the multiwavelength light;

a first optical fiber amplifying unit for receiving and amplifying a multiwavelength light output from said variable optical attenuator in accordance with an excitation light provided to said first optical fiber amplifying unit;

a light source for providing the excitation light to said first optical fiber amplifying unit; and control means for controlling a light intensity of said light source in such a way that the optical level of the multiwavelength light output from said first optical fiber amplifying unit is kept constant, and for controlling attenuation of said variable optical attenuator in such a way that each of optical levels of a plurality of wavelength bands in the multiwavelength light output from said first optical fiber amplifying unit matches each other irrespective of wavelength dependency of the optical levels of the plurality of wavelength bands in the multiwavelength light when received by the first optical fiber amplifying unit.

2. The optical equalizing amplifier according to claim 1, further comprising before said variable optical attenuator:

a second optical fiber amplifying unit for amplifying the multiwavelength light with a constant gain.

3. The optical equalizing amplifier according to claim 1, further comprising before said variable optical attenuator:

a third optical fiber amplifying unit for receiving a constant excitation light and amplifying the multiwavelength light.

4. The optical equalizing amplifier according to claim 1, wherein said control means makes a portion of the multiwavelength light output from said first optical fiber amplifying unit branch into a plurality of wavelength bands, and controls attenuation of said variable optical attenuator such that a detected optical level of a shortest wavelength band equals a detected optical level of a longest wavelength band of wavelength bands whose optical levels exceed a predetermined level.

5. An optical equalizing amplifier for equalizing a multiwavelength light, comprising:

a first optical fiber amplifying unit for receiving and amplifying the multiwavelength light in accordance with an excitation light provided to said first optical fiber amplifying unit;

a light source for providing the excitation light to said first optical fiber amplifying unit;

a variable optical attenuator for adjusting an optical level of a multiwavelength light output from said first optical fiber amplifying unit; and control means for controlling a light intensity of said light source in such a way that optical levels of a plurality of wavelength bands in the multiwavelength light output from said first optical fiber amplifying unit match each other irrespective of wavelength dependency of the optical levels of the plurality of wavelength bands in the multiwavelength light when received by the first optical fiber amplifying unit, and for controlling attenuation of said variable optical attenuator in such a way that the optical level of the multiwavelength light output from said variable optical attenuator is kept constant.

6. The optical equalizing amplifier according to claim 5, further comprising:

a second optical fiber amplifying unit for amplifying with a constant gain the multiwavelength light output from said variable optical attenuator.

7. The optical equalizing amplifier according to claim 5, further comprising:

a third optical fiber amplifying unit for receiving a constant excitation light and amplifying the multiwavelength light output from said variable optical attenuator.

8. The optical equalizing amplifier according to claim 5, further comprising:

a fourth optical fiber amplifying unit after said variable optical attenuator, wherein an optical level of the multiwavelength light output from said fourth optical fiber amplifying unit is controlled to be kept constant.

9. The optical equalizing amplifier according to claim 5, wherein said control means makes a portion of the multiwavelength light output from said first optical fiber amplifying unit branch into a plurality of wavelength bands, and controls the light intensity of said light source such that a detected optical level of a shortest wavelength band equals a detected optical level of a longest wavelength band of wavelength bands whose optical levels exceed a predetermined level.

10. An optical equalizing amplifier for equalizing a multiwavelength light, comprising:

an optical fiber amplifying unit for receiving and amplifying the multiwavelength light with a plurality of optical fiber amplifiers connected in series, said optical fiber amplifiers having different amplification characteristics dependant on wavelength;

a plurality of light sources for providing excitation lights to the plurality of optical fiber amplifiers; and control means for controlling each light intensity of said plurality of light sources in such a way that each of optical levels of a plurality of wavelength bands in the multiwavelength light output from said optical fiber amplifying unit matches each other irrespective of wavelength dependency of the optical levels of the plurality of wavelength bands in the multiwavelength light when received by the optical fiber amplifying unit.

11. An optical equalizer for equalizing a multiwavelength light, comprising:

an optical fiber amplifying unit for amplifying a multiwavelength light;

a variable optical attenuator for adjusting an optical level of the multiwavelength light input to said optical fiber amplifying unit; and control means for selecting a plurality of wavelength bands from a portion of the multiwavelength light output from said optical fiber amplifying unit and for controlling attenuation of said variable optical attenuator in such a way that each optical level of each wavelength band matches each other.

12. An optical equalizing amplifier for equalizing a multiwavelength light, comprising:

optical level adjusting means for adjusting an optical level of a multiwavelength light;

an optical fiber amplifying unit for amplifying the multiwavelength light output from said optical level adjusting means in accordance with an excitation light provided to said optical fiber amplifying unit;

a light source for providing the excitation light to said optical fiber amplifying unit; and control means for controlling a light intensity of the light source in such a way that the optical level of the multiwavelength light output from said optical fiber amplifying unit is kept constant, and for controlling said optical level adjusting means so as to equalize optical levels of a plurality of wavelength bands in the multiwavelength light output from said optical fiber amplifying unit.

13. An optical equalizing amplifier for equalizing a multiwavelength light, comprising:
   an optical fiber amplifying unit for amplifying the multiwavelength light in accordance with an excitation light provided to said optical fiber amplifying unit;
   a light source for providing the excitation light to said optical fiber amplifying unit;
   optical level adjusting means for adjusting an optical level of a multiwavelength light output from said optical fiber amplifying unit; and
   control means for controlling a light intensity of the light source so as to equalize optical levels of a plurality of wavelength bands in the multiwavelength light output from said optical fiber amplifying unit, and for controlling said optical level adjusting means in such a way that the optical level of the multiwavelength light output from said optical level adjusting means is kept constant.

14. An optical equalizer for equalizing a multiwavelength light, comprising:
   an optical fiber amplifying unit for receiving and amplifying a multiwavelength light;
   optical level adjusting means for adjusting an optical level of the multiwavelength light input to said optical fiber amplifying unit; and
   control means for controlling said optical level adjusting means in such a way that each optical level of each of a plurality of wavelength bands in the multiwavelength light output from said optical fiber amplifying unit matches each other irrespective of wavelength dependency of the optical levels when the multiwavelength light is received by the optical fiber amplifying unit.

15. An optical equalizing amplifier for equalizing a multiwavelength light, comprising:
   optical level adjusting means for adjusting an optical level of a wavelength division multiplexed optical light;
   optical fiber amplifying unit for amplifying the multiwavelength light output from said optical level adjusting means;
   a light source for providing an excitation light to said optical fiber amplifying unit; and
   branch means comprising a plurality of wavelength transmission bands for generating a plurality of lights having different wavelength components from a portion of the multiwavelength light amplified by said optical fiber amplifying unit; and
   control means for controlling a light intensity of the light source in such a way that the optical level of the multiwavelength light output from said optical fiber amplifying unit is kept constant, and for controlling said optical level adjusting means based on a plurality of optical levels output from said branch means.

16. An optical amplifying/equalizing method for equalizing a multiwavelength light, comprising the steps of:
   adjusting an optical level of the multiwavelength light using a variable optical attenuator;
   amplifying the multiwavelength light whose optical level has been adjusted by the variable optical attenuator, the amplifying being performed by an optical fiber amplifier in accordance with an excitation light provided to the optical fiber amplifier;
   controlling the optical level of the excitation light provided to the optical fiber amplifier in such a way that the optical level of the multiwavelength light output from the optical fiber amplifier is kept constant, and
   controlling attenuation of the variable optical attenuator so as to equalize optical levels of a plurality of wavelength bands in the multiwavelength light.

17. An optical equalizing/amplifying method for equalizing a multiwavelength light, comprising the steps of:
   amplifying the multiwavelength light using an optical fiber amplifier in accordance with an excitation light provided to the optical fiber amplifier;
   adjusting, using a variable optical attenuator, an optical level of the multiwavelength light amplified by the optical fiber amplifier;
   controlling the optical level of the excitation light provided to the optical fiber amplifier so as to equalize the output level of a plurality of wavelength bands in the multiwavelength light; and
   controlling attenuation of the variable optical attenuator in such a way that the optical level of the multiwavelength light output from the variable optical attenuator is kept constant.

18. An optical equalizing amplifier for equalizing a multiwavelength light, comprising:
   a variable optical attenuator for adjusting an optical level of the multiwavelength light;
   a first optical fiber amplifying unit for amplifying a multiwavelength light output from the variable optical attenuator in accordance with an excitation light provided to the first optical fiber amplifying unit;
   a light source for providing the excitation light to the first optical fiber amplifying unit; and
   control means for controlling a light intensity of the light source in such a way that the optical level of the multiwavelength light output from the first optical fiber amplifying unit is kept constant, and for controlling attenuation of the variable optical attenuator in such a way that each of optical levels of a plurality of wavelength bands in the multiwavelength light output from the first optical fiber amplifying unit matches each other,
   wherein the control means makes a portion of the multiwavelength light output from the first optical fiber amplifying unit branch into a plurality of wavelength bands, and controls attenuation of the variable optical attenuator such that a detected optical level of a shortest wavelength band equals a detected optical level of a longest wavelength band of wavelength bands whose optical levels exceed a predetermined level.

19. An optical equalizing amplifier for equalizing a multiwavelength light, comprising:
   a first optical fiber amplifying unit for amplifying the multiwavelength light in accordance with an excitation light provided to the first optical fiber amplifying unit;
   a light source for providing the excitation light to the first optical fiber amplifying unit;
   a variable optical attenuator for adjusting an optical level of a multiwavelength light output from the first optical fiber amplifying unit; and
   control means for controlling a light intensity of the light source in such a way that optical levels of a plurality of wavelength bands in the multiwavelength light output from the first optical fiber amplifying unit match each other, and for controlling attenuation of the variable optical attenuator in such a way that the optical level of the multiwavelength light output from the variable optical attenuator is kept constant,
   wherein the control means makes a portion of the multiwavelength light output from the first optical fiber amplifying unit branch into a plurality of wavelength bands, and controls the light intensity of the light source such that a detected optical level of a shortest wavelength band equals a detected optical level of a longest wavelength band of wavelength bands whose optical levels exceed a predetermined level.

20. An apparatus for amplifying a multiwavelength light including first and second wavelength bands at first and second optical levels, respectively, the apparatus comprising:
- a variable optical attenuator adjusting the first and second optical levels in the multiwavelength light;
- an optical amplifier amplifying the first and second optical level adjusted multiwavelength light; and
- a controller controlling the optical amplifier to maintain the amplified multiwavelength light at a constant power level, and controlling the variable optical attenuator to equalize the first and second optical levels in the amplified multiwavelength light.

21. An apparatus as in claim 20, wherein
the optical amplifier receives an excitation light and amplifies the multiwavelength light in accordance with the power level of the excitation light, and
the controller controls the optical amplifier by controlling the power level of the excitation light.

22. An apparatus as in claim 20, wherein
the multiwavelength light includes more than two wavelength bands, each at a corresponding optical level,
the variable optical attenuator adjusts the optical level of each wavelength band in the multiwavelength light,
the optical amplifier amplifies the optical level adjusted multiwavelength light; and
the controller controls the optical amplifier to maintain the amplified multiwavelength light at a constant power level, and controls the variable optical attenuator to equalize the optical levels of the wavelength bands in the amplified multiwavelength light.

23. An apparatus for amplifying a multiwavelength light including first and second wavelength bands at first and second optical levels, respectively, the apparatus comprising:
- an optical amplifier amplifying the multiwavelength light;
- a variable optical attenuator adjusting the first and second optical levels in the amplified multiwavelength light; and
- a controller controlling the optical amplifier to equalize the first and second optical levels, and controlling the variable optical attenuator to maintain the amplified multiwavelength light at a constant power level.

24. An apparatus as in claim 23, wherein
the optical amplifier receives an excitation light and amplifies the multiwavelength light in accordance with the power level of the excitation light, and
the controller controls the optical amplifier by controlling the power level of the excitation light.

25. An apparatus as in claim 23, wherein
the multiwavelength light includes more than two wavelength bands, each at a corresponding optical level,
the optical amplifier amplifies the multiwavelength light;
the variable optical attenuator adjusts the optical level of each wavelength band in the amplified multiwavelength light, and
the controller controls the optical amplifier to equalize the optical levels of the wavelength bands in the amplified multiwavelength light, and controls the variable optical attenuator to maintain the amplified multiwavelength light at a constant power level.

26. A method for amplifying a multiwavelength light including first and second wavelength bands at first and second optical levels, respectively, the method comprising the steps of:
- adjusting the first and second optical levels in the multiwavelength light; and
- amplifying the first and second optical level adjusted multiwavelength light, wherein
  - the amplifying step maintains the amplified multiwavelength light at a constant power level, and
  - the adjusting step equalizes the first and second optical levels in the amplified multiwavelength light.

27. A method for amplifying a multiwavelength light including first and second wavelength bands at first and second optical levels, respectively, the method comprising the steps of:
- amplifying the multiwavelength light; and
- adjusting the first and second optical levels in the amplified multiwavelength light, wherein
  - the amplifying step equalizes the first and second optical levels, and
  - the adjusting step maintains the amplified multiwavelength light at a constant power level.

* * * * *